(12) United States Patent
Fink et al.

(10) Patent No.: US 9,785,877 B1
(45) Date of Patent: Oct. 10, 2017

(54) SYSTEMS AND METHODS FOR RFID-ENABLED PRESSURE SENSING APPARATUS

(71) Applicant: The United States of America as represented by the Administrator of the National Aeronautics and Space Administration, Washington, DC (US)

(72) Inventors: Patrick W. Fink, Missouri City, TX (US); Gregory Y. Lin, Friendswood, TX (US); Timothy F. Kennedy, Sugar Land, TX (US); Phong H. Ngo, Friendswood, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 30 days.

(21) Appl. No.: 15/065,215

(22) Filed: Mar. 9, 2016

Related U.S. Application Data

(62) Division of application No. 13/790,927, filed on Mar. 8, 2013, now Pat. No. 9,305,252.

(51) Int. Cl.
| | |
|---|---|
| *G08B 13/14* | (2006.01) |
| *G06K 19/07* | (2006.01) |
| *G06K 19/077* | (2006.01) |
| *G06F 3/01* | (2006.01) |

(52) U.S. Cl.
CPC ......... *G06K 19/0723* (2013.01); *G06F 3/014* (2013.01); *G06K 19/07749* (2013.01)

(58) Field of Classification Search
CPC ......... G06K 19/0723; G06K 19/07749; G08C 17/02; G06F 3/014; H01Q 1/22
USPC ....................................... 340/572.7
See application file for complete search history.

(56) References Cited

U.S. PATENT DOCUMENTS

| | | |
|---|---|---|
| 5,491,484 A | 2/1996 | Schuermann |
| 5,911,529 A | 6/1999 | Crisan |
| 5,954,920 A | 9/1999 | Katayama et al. |
| 6,133,833 A | 10/2000 | Sidlauskas et al. |
| 7,034,685 B2 * | 4/2006 | Fabre ................. G06K 7/10336 235/385 |

(Continued)

*Primary Examiner* — John A Tweel, Jr.
(74) *Attorney, Agent, or Firm* — Kurt G. Hammerle

(57) ABSTRACT

Methods, apparatuses and systems for radio frequency identification (RFID)-enabled information collection are disclosed, including an enclosure, a collector coupled to the enclosure, an interrogator, a processor, and one or more RFID field sensors, each having an individual identification, disposed within the enclosure. In operation, the interrogator transmits an incident signal to the collector, causing the collector to generate an electromagnetic field within the enclosure. The electromagnetic field is affected by one or more influences. RFID sensors respond to the electromagnetic field by transmitting reflected signals containing the individual identifications of the responding RFID sensors to the interrogator. The interrogator receives the reflected signals, measures one or more returned signal strength indications ("RSSI") of the reflected signals and sends the RSSI measurements and identification of the responding RFID sensors to the processor to determine one or more facts about the influences. Other embodiments are also described.

19 Claims, 25 Drawing Sheets

(56) References Cited

U.S. PATENT DOCUMENTS

| | | |
|---|---|---|
| 7,113,125 B2 | 9/2006 | Le Sesne |
| 7,242,293 B2 * | 7/2007 | Rea .................. G01S 13/878 2/159 |
| 7,768,409 B2 * | 8/2010 | Parias ................ G06Q 10/087 340/539.1 |
| 7,805,214 B2 * | 9/2010 | Yamauchi ............. G06F 3/014 340/10.1 |
| 8,089,376 B2 | 1/2012 | Oberle |
| 8,279,091 B1 * | 10/2012 | Tran .................. G06F 3/014 340/4.1 |
| 8,288,923 B2 | 10/2012 | Vaidyanathan |
| 8,482,412 B2 * | 7/2013 | Majoros .............. G06K 7/0008 340/10.1 |
| 8,786,470 B2 | 7/2014 | Yang |
| 2004/0233172 A1 | 11/2004 | Schneider et al. |
| 2005/0237295 A1 | 10/2005 | Anderson |
| 2005/0285742 A1 | 12/2005 | Charych et al. |
| 2006/0132351 A1 | 6/2006 | Le Sesne |
| 2006/0145863 A1 | 7/2006 | Martin et al. |
| 2007/0040655 A1 | 2/2007 | Lee et al. |
| 2007/0057792 A1 | 3/2007 | Alden |
| 2007/0072567 A1 | 3/2007 | Nagai et al. |
| 2007/0254080 A1 | 11/2007 | Schackmuth et al. |
| 2007/0268139 A1 | 11/2007 | Sweeney, II |
| 2008/0180222 A1 | 7/2008 | Hollister et al. |
| 2009/0167502 A1 | 7/2009 | Erickson et al. |
| 2009/0215395 A1 | 8/2009 | Henty |
| 2009/0273527 A1 | 11/2009 | Behdad |
| 2010/0152947 A1 | 6/2010 | Denholm et al. |
| 2010/0277320 A1 | 11/2010 | Gold |
| 2011/0012712 A1 | 1/2011 | Khozyalnov |
| 2011/0291836 A1 | 12/2011 | Deavours et al. |
| 2012/0001735 A1 | 1/2012 | Fink et al. |
| 2012/0043824 A1 | 2/2012 | Pu et al. |
| 2012/0106526 A1 | 5/2012 | Yousefi et al. |
| 2012/0223142 A1 | 9/2012 | Wang et al. |
| 2012/0278228 A1 | 11/2012 | Rubinstein |
| 2013/0057476 A1 | 3/2013 | Tseng |
| 2013/0062101 A1 | 3/2013 | Kanai et al. |
| 2013/0162490 A1 | 6/2013 | Blech |
| 2014/0229847 A1 | 8/2014 | Park |
| 2014/0253452 A1 | 9/2014 | Miller et al. |
| 2016/0132110 A1 * | 5/2016 | Mutz ..................... G06F 3/014 340/870.07 |
| 2016/0161301 A1 * | 6/2016 | Guenther ............... G07C 1/00 702/150 |

\* cited by examiner

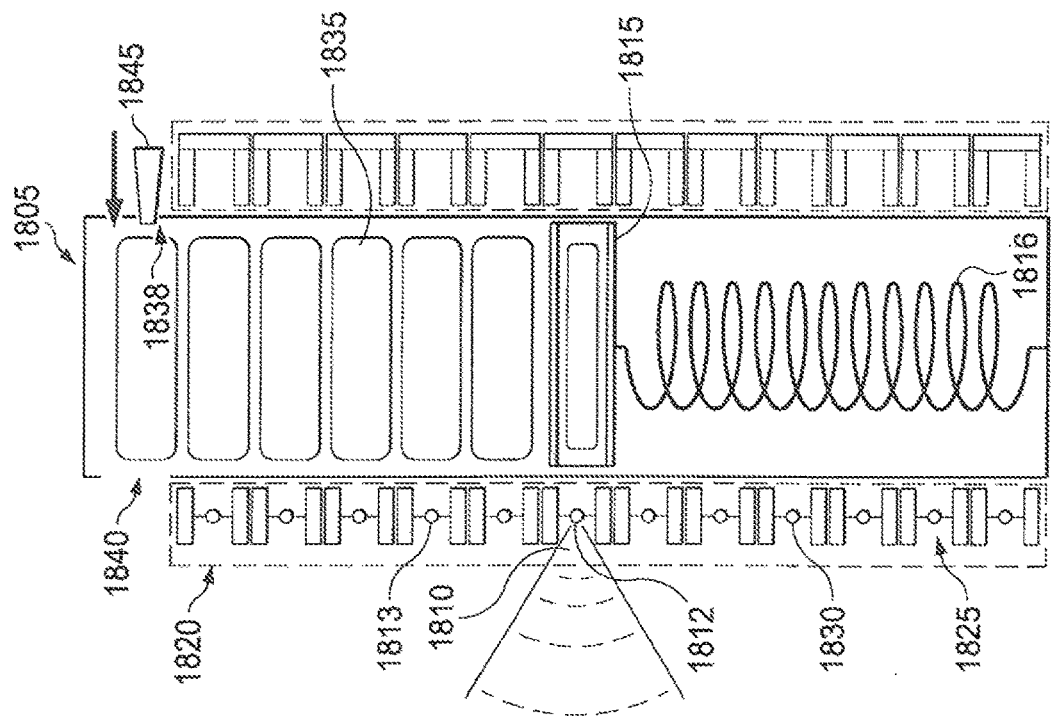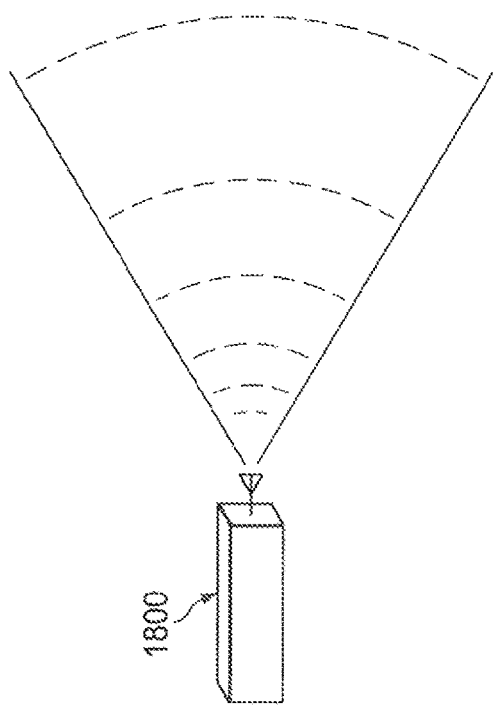
FIG. 18

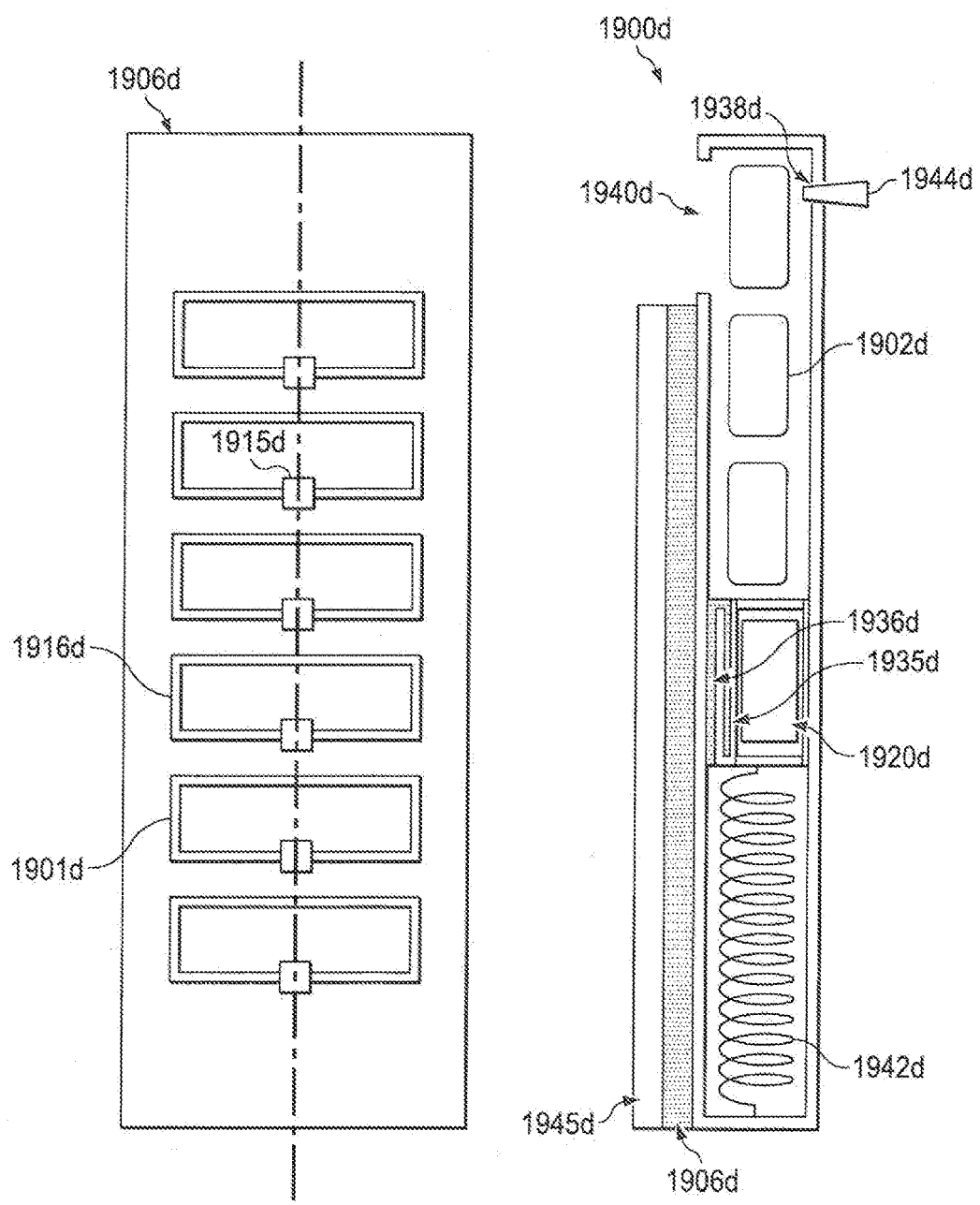
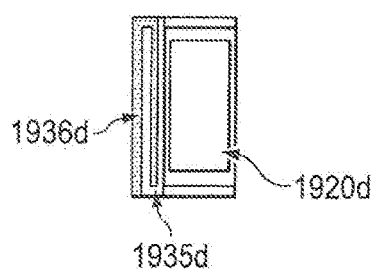
FIG. 19d

SYSTEMS AND METHODS FOR RFID-ENABLED PRESSURE SENSING APPARATUS

I. CROSS REFERENCE TO RELATED APPLICATION

This is a divisional application of Application Ser. No. 13/790,927

II. ORIGIN OF THE INVENTION

The invention described herein was made by employees of the United States Government and may be manufactured and used by or for the Government of the United States of America for governmental purposes without the payment of any royalties thereon or therefor.

III. BACKGROUND OF THE DISCLOSURE

The embodiments described herein relate generally to the field of radio frequency identification ("RFID").

IV. SUMMARY

The embodiments described herein relate to applications of radio frequency identification (RFID) technology to monitor and manage inventory, including RFID-enabled dispensers, which permit tracking of small items, such as pills or grains, for which attachment of individual RFID sensors is impractical. Other inventory management applications include level detectors, in which the level of material filling a volume is sensed. Sensor applications include a distributed pressure sensor.

Methods, apparatuses and systems for RFID-enabled information collection are disclosed, including a system comprising an enclosure, a collector coupled to the enclosure, an interrogator, a processor, and one or more RFID field sensors, each having an individual identification, disposed within the enclosure. The interrogator is configured to transmit an incident signal to the collector, causing the collector to generate an electromagnetic field within the enclosure. The electromagnetic field is affected by one or more influences. One or more of the RFID sensors respond to the electromagnetic field by transmitting, via the collector, a reflected signal to the interrogator, the reflected signals containing the individual identifications of the responding RFID sensors. The interrogator is configured to receive the reflected signals, measure one or more returned signal strength indications ("RSSI") of the reflected signals and send the RSSI measurements and the corresponding identification of the responding RFID sensors as information to the processor. The processor is configured to analyze the information to determine one or more facts about the influences.

Another embodiment disclosed is a RFID-enabled dispenser including a parallel plate waveguide comprising a plurality of conductive layers and a dispensing container placed within the waveguide. The dispensing container has an opening for dispensing items and a dispensing element for moving the items to be dispensed through the opening. The dispensing container also has a traveler for moving items within the dispensing container towards the opening, the traveler moving in response to force exerted by a forcing element. An antenna, coupled to the waveguide, is configured to generate an electromagnetic field within the waveguide in response to an incident signal sent from an interrogator, the electromagnetic field being affected by one or more influences. One or more RFID field sensors are placed inside the waveguide at intervals along the axial direction of the waveguide. Each RFID field sensor has an identification and is capable of responding to the electromagnetic field by transmitting, via the antenna, reflected signals to the interrogator, the reflected signals containing the identification of the responding RFID field sensors. The interrogator is further configured to receive the reflected signals, measure one or more returned signal strength indications (RSSI) of the reflected signals and send the RSSI measurements and the corresponding identification of the responding RFID field sensors as inputs to the processor for use by the processor in making at least one determination about the one or more influences.

Another embodiment disclosed is a RFID-enabled dispenser comprising a holder and a dispensing container placed within the holder. The holder has an elongated structure with multiple antenna cells, each antenna cell containing an RFID circuit having a unique identification. Each antenna cell is of sufficient size for resonance, so that the antenna cell may tune to an operating frequency of its RFID circuit. The dispensing container has an opening for dispensing items from the dispensing container and a traveler for moving items within the dispensing container towards the opening. The traveler moves in response to force exerted by a forcing element. The traveler includes a dielectric body (which may include optional metallic or conductive components), the position of the traveler and its dielectric body activating a particular antenna cell in which the traveler is positioned and enabling the RFID circuit within the particular antenna cell to receive an incident signal from an interrogator and to send a response to the interrogator. The interrogator is configured to receive the response, measure one or more returned signal strength indications ("RSSI") of the response and send the RSSI measurements and the corresponding identification of the responding RFID field sensors as information to a processor. The processor is configured to use the information received from the interrogator to determine the position of the traveler. The items may comprise packages of one or more objects. In one embodiment, for example, the items may be disk-shaped and include segmented packaging for separating two or more of the objects.

Another embodiment described herein is an apparatus for a radio frequency identification (RFID)-enabled pressure sensing glove, including a glove having a palm side, a back side, and at least one digit. The glove includes a plurality of ring elements, each on a foam pad, the foam pads being attached to the palm side of the glove on the at least one digit and palm, each ring element including a RFID sensor attached to a near field loop, and a microstrip patch antenna on the back side of the glove. The microstrip patch antenna is connected to one or more microstrip lines coupling the antenna to the ring elements, the microstrip lines each terminating in a load element near the end of each digit, which prevents development of a standing wave pattern. Pressure on a ring element activates its RFID sensor allowing the RFID sensor to transmit a signal to an interrogator.

Yet another embodiment described herein is an apparatus for a radio frequency identification (RFID)-enabled pressure sensitive keypad. The RFID-enabled keypad includes a plurality of RFID tags bonded to an operatively insulating and compressible substrate and an operably planar open waveguide, the waveguide being bonded on an operatively insulating dielectric base and in communication with a collector. A load is connected to one end of the waveguide.

The substrate bearing the RFID tags is positioned over the base and adjacent to a conductor of the waveguide, one or more of the RFID tags being energized when operably depressed to send signals via the collector to an interrogator, an electromagnetic coupling being enabled between the waveguide and the depressed RFID tag.

Another embodiment described herein is a method of determining one or more influences on a generated electromagnetic field. The method comprises the step of transmitting an incident signal from an interrogator to a collector coupled to a waveguide causing the collector to generate the electromagnetic field along the waveguide. The electromagnetic field may be affected by the one or more influences. The waveguide contains one or more radio frequency identification (RFID) sensors, each RFID sensor having an individual assigned identification. The method further comprises the steps of transmitting a reflected signal from one or more of the RFID sensors via the collector to the interrogator in response to the electromagnetic field, the reflected signal including the individual identification from the responding RFID sensors, measuring one or more returned signal strength indications ("RSSI") of the reflected signal by the interrogator, and sending the RSSI measurements and the corresponding identification of the responding RFID field sensors from the interrogator to a processor. The method further comprises the step of analyzing the RSSI measurements and identifications by the processor to make determinations about the one or more influences.

Another embodiment disclosed is an apparatus for use as a switch, comprising at least one RFID tag, each RFID tag comprising an antenna element and an RFID integrated circuit, at least one source element, and at least one lever arm. Each lever arm is connected to one of the RFID tags, and each lever arm is capable of two positions. One of the positions places the lever arm and the RFID tag connected thereto into alignment with the source element.

Another embodiment disclosed is a system for radio frequency identification (RFID)-enabled information collection comprising one or more antenna cells comprising ring elements, each ring element including a conductive ring connected to a RFID integrated circuit, at least one source element, an interrogator capable of transmitting a signal to the source element and a processor in communication with the interrogator. At least one of the conductive rings is capable of coupling to its source element when the conductive ring is in a first position, energizing the RFID circuit associated with the conductive ring to respond to the interrogator's signal. The processor is capable of deriving information regarding the positions and orientations of the one or ring elements relative to the one or more sources. The source element may be an antenna element, or in another embodiment the source element may be an open waveguide, such that the ring element can couple to the waveguide structure when it is in the proper position and/or orientation. The conductive ring and the source element may be placed on door components such that the conductive ring couples to the source element only when the door is in a first position.

Other aspects and advantages of the embodiments described herein will become apparent from the following description and appended claims, taken in conjunction with the accompanying drawings, illustrating the principles of the embodiments by way of example only.

V. BRIEF DESCRIPTION OF THE DRAWINGS

FIGS. 8b-8e are illustrations depicting additional details of a capacitively-fed planar inverted F antenna ("PIFA"), such as the one used for the RFID-enabled container of in FIG. 8a.

FIG. 9 is a graph depicting the results of four tests performed using the embodiment of FIG. 8a.

FIG. 18 is a schematic diagram of an interrogation of an RFID-enabled item dispenser in accordance with one or more embodiments described herein.

FIG. 19d is a schematic diagram of an RFID-enabled item dispenser in accordance with one or more embodiments described herein, in which a traveler conductive surface provides a folded ground plane with a short.

Figure 1:
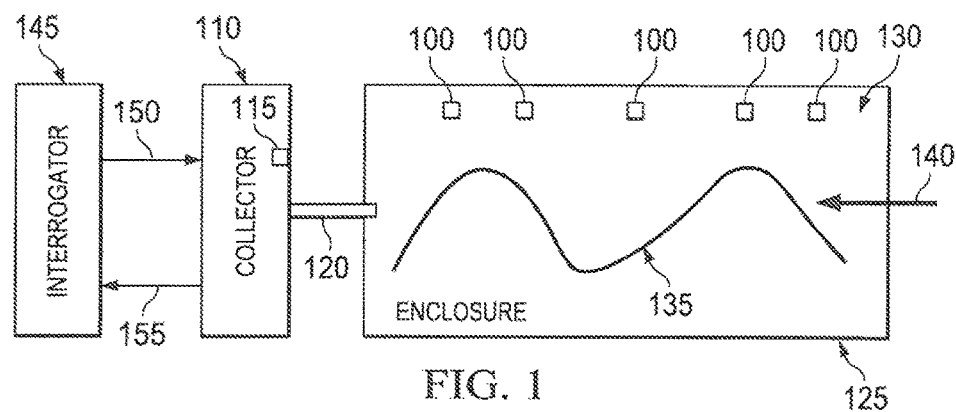
FIG. 1 is a schematic diagram, in accordance with one or more embodiments described herein, of an RFID-enabled enclosure in the form of a cavity comprising a container.

While the appended claims are subject to various modifications and alternative forms, specific embodiments thereof are shown by way of example in the drawings and the accompanying detailed description. It should be understood, however, that the drawings and detailed description are not intended to limit the appended claims to the particular embodiments described herein. This description and disclosure is instead intended to cover all modifications, equivalents, and alternatives falling within the scope of the present invention as defined by the appended claims.

VI. DETAILED DESCRIPTION

The drawings are not necessarily to scale and certain features may be shown exaggerated in scale or in somewhat generalized or schematic form in the interest of clarity and conciseness. In the description which follows, like parts may be marked throughout the specification and drawings with the same reference numerals. The foregoing detailed description is provided for a more complete understanding of the accompanying drawings. It should be understood, however, that the embodiments described herein are not limited to the precise arrangements and configurations shown. Although the design and use of one or more embodiments are discussed in detail below, it should be appreciated that the present description provides many inventive concepts that may be embodied in a wide variety of contexts. The specific aspects and embodiments discussed herein are merely illustrative of ways to make and use the embodiments described, and do not limit the scope of the appended claims. It would be impossible or impractical to include all of the possible embodiments and contexts of the appended claims in this description. Upon reading this description, alternative embodiments within the scope of the appended claims will be apparent to persons of ordinary skill in the art.

FIG. 1 depicts one or more embodiments described herein comprising two or more RFID field sensors 100, a collector 110, a coupling 120, and an enclosure 130 comprising an enclosing surface or volume 125 defining a resonator (such as a waveguide or a cavity, as depicted in FIG. 1) or other enclosure 130. The collector 110 funnels, via the coupling 120, electromagnetic energy creating an electromagnetic field 135 into the enclosure 130. The electromagnetic field 135 is distributed throughout the enclosure 130 according to Maxwell's equations. The distribution of the electromagnetic field 135 within the enclosure 130 may be affected by one or more conditions referred to herein as influences 140. The influences 140 may be connected to substances such as materials or liquids within the enclosure. The RFID field sensors 100 are within and preferably distributed throughout the enclosure 130. An RFID reference sensor 115 is typically located within or adjacent to the collector 110.

Continuing to refer to FIG. 1, an interrogator 145 sends an incident signal 150, to the collector 110, which, as described above, generates the electromagnetic field 135 within the enclosure 130. The RFID field sensors 100 and/or the RFID reference sensor 115, each having their own identification information, respond to the electromagnetic field 135 by sending reflected signals 155 with the identification of the responding RFID field sensor 100 or RFID reference sensor 115, to the interrogator 145 via the coupling 120 and collector 110. The incident signal 150 and reflected signals 155 comprise radio frequency (RF) signals. The interrogator 145 measures returned signal strength indications ("RSSI") of the reflected signals 155, the RSSI measurements preferably including the strength and the phase of the reflected signals 155. A processor (not separately depicted in FIG. 1) residing in, or connected to, the interrogator 145 determines the characteristics of the influences 140 based on the reflected signals 155 from the one or more RFID field sensors 100 and/or the RFID reference sensor 115. Measurements of the reflected signal 155 from the RFID reference sensor 115 may be compared to measurements of the reflected signals 155 from the responding RFID field sensors 100 to identify and remove extraneous variations not related to the influences on the electromagnetic field.

In alternate embodiments, measurements of the electromagnetic field 135 may be made by the RFID field sensors 100 and reference sensor 115 and transmitted to the interrogator.

Although the cross-section of the enclosing surface 125 in FIG. 1 is depicted as a rectangle or box, the enclosing surface 125 may be of any shape convenient to the application. Although RF signals described above are commonly transmitted at 900 MHz UHF, different frequency bands may be used with the embodiments described herein. The RFID sensors 100, 115 used may be for example RFID integrated circuit sensors, Surface Acoustic Wave (SAW) RFID sensors or any other RFID sensor suitable for the purpose.

Figure 2:
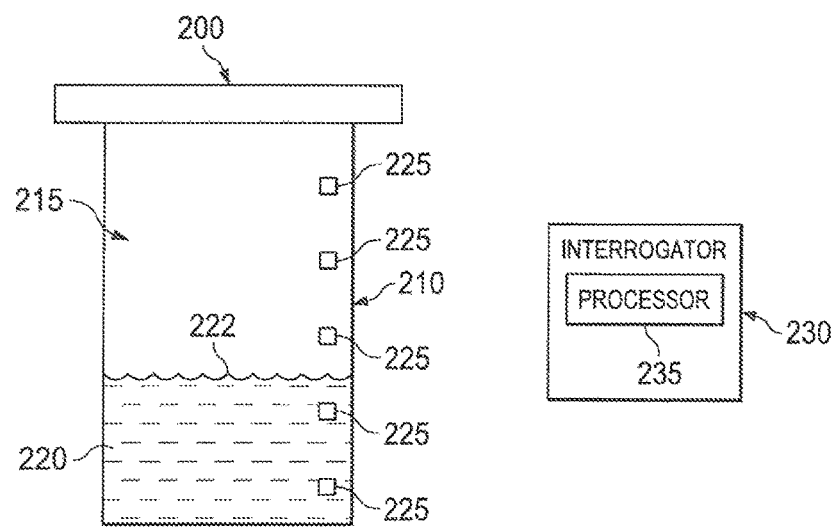
FIG. 2 is a schematic diagram in accordance with one or more embodiments described herein in which an RFID-enabled enclosure is in the form of a cavity comprising a container and a collector comprising an antenna lid on the container.

FIG. 2 depicts one or more embodiments of the present disclosure described herein in which the collector comprises a lid antenna 200 on a cylindrical enclosure 210, which defines a cavity 215 (or waveguide) and which is at least partially filled with fill material 220 to a fill level 222. The amount of fill material 220 and corresponding fill level 222 may vary over time. An interrogator 230 sends an incident signal (not depicted) to a coupler (not depicted in FIG. 2) which transfers the incident signal into the cavity 215 so as to establish an electromagnetic field distribution therein. The coupler might comprise, for example, an aperture shared between the lid antenna 200 and the cavity 215, or the coupler might comprise a probe from the lid antenna 200 that protrudes into the cavity 215.

Continuing to refer to FIG. 2, one or more RFID field sensors 225 having identification information are positioned within the enclosure 210. Each RFID field sensor 225 may be, for example, an RFID integrated circuit, a SAW RFID or any other suitable RFID sensor. The RFID field sensors 225 that respond to the electromagnetic field send their identification information in reflected signals to the interrogator 230 via the lid antenna 200. The fill material 220 and fill level 222 comprise influences affecting the electromagnetic field. The interrogator 230 receives the reflected signals, measures the RSSI of the reflected signals, and sends the RSSI measurements with the corresponding identification of the responding RFID field sensors 225 to a processor 235, which may be within or connected to or otherwise in communication with the interrogator 230. The processor 235 determines the type of fill material and/or the fill level based on the information received from the interrogator 230. In FIG. 2, the processor 235 is depicted within the interrogator 230, but the processor 235 and interrogator 230 could be separate and in communication with each other. One or more reference RFID field sensors (not depicted in FIG. 2) may be disposed on the exterior of the enclosure 210 or on or within the lid antenna 200.

In an alternative embodiment, the RFID field sensors 225 measure or estimate the received power and/or phase of the electromagnetic field and transmit the measurements to the interrogator 230, along with the corresponding identification numbers of the responding RFID field sensors 225.

For embodiments of the present disclosure in which the enclosure 210 forms a hollow waveguide or cavity, propagation of the electromagnetic field down the cavity or waveguide depends on wavelength, so the cavity or waveguide may need to be of a sufficient size such that the signal is above a "cutoff" frequency. In one or more embodiments, the cavity or waveguide is below cutoff when empty but is above cutoff during the presence of an influence. For example, the dielectric property of a fill material can shift the waveguide cutoff frequency below the RFID operating frequency to enable one or more RFID field sensors. In other embodiments, metamaterials are employed in the cavity or waveguide to lower the cutoff frequency as an alternative to increasing the waveguide or cavity size. In other embodiments, a second conductor, such as an inner conductor, which may be in a coaxial configuration or offset, is used so as to avoid size restrictions and the associated cutoff frequency. In embodiments of the present disclosure having an outer conductor and an inner conductor, the electromagnetic field will be generated between the outer conductor and the inner conductor. In such a configuration, the waveguide is capable of propagating a wave that is substantially transverse electromagnetic (TEM). Transverse waves are waves where the disturbance is perpendicular to the direction of propagation. If one throws a stone into a lake, a transverse wave is created: the waves move outward from the point the stone entered the water, but to create the "wave," the water in the lake moves up and down. In TEM waves, the electric and magnetic field disturbances are perpendicular both to each other and to the direction of the propagation of the wave. The outer conductor and the inner conductor may have various shapes and/or cross sections. The inner conductor may be centered within the outer conductor or may be offset.

Figure 3:
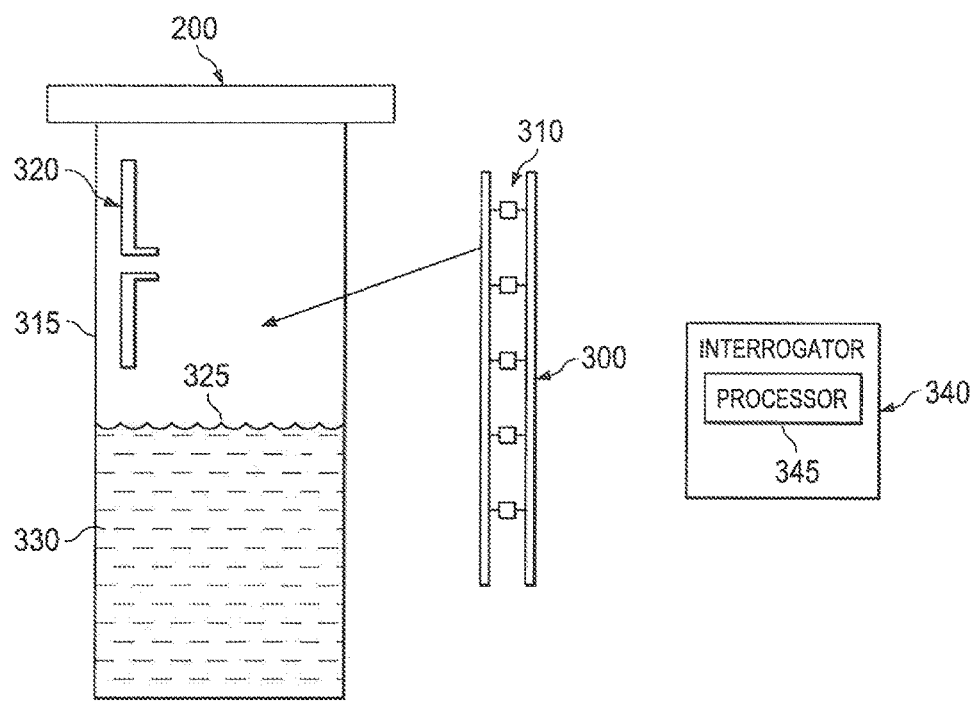
FIG. 3 is a schematic diagram in accordance with one or more embodiments described herein of an RFID-enabled container with RFID field sensors in the form of an array of RFID integrated circuits.

FIG. 3 depicts an exploded diagram of one or more embodiments of an RFID-enabled information collection system comprising a thin transmission line 300 attached to a nonconductive enclosure 315, with one or more RFID tags such as RFID integrated circuit chips 310 attached in parallel fashion along the transmission line 300. An antenna 320 attached to the enclosure 315 serves as the collector. The antenna 320 is connected to the transmission line 300. An interrogator 340 sends an incident signal to the antenna 320, which launches an electromagnetic field along the transmission line 300. Similar to conventional RFID tags, the thin RFID transmission line 300 can be printed on a thin, flexible plastic layer that attaches to the inside or outside of the enclosure 315 with an adhesive.

In the embodiment depicted in FIG. 3, the enclosure 315 is nonconductive and sufficiently thin-walled, such that the electromagnetic field along the transmission line 300 is influenced by fill material 330 and its fill level 325 inside the enclosure 315. Each RFID integrated circuit chip 310 responding to the electromagnetic field sends its identification with a reflected signal to the interrogator 340, which measures the RSSI, such as the strength and or phase of the reflected signals. In alternative embodiments, the RFID integrated circuit chips 310 on the transmission line 300 may measure the power of the electromagnetic field and transmit the measurements of electromagnetic field, along with the identification of each RFID integrated circuit chip 310 performing the measurement, to the interrogator 340.

The interrogator 340 includes or is connected to a processor 345, which uses the RSSI measurements with algorithms running on the processor 345 to determine the fill level 325, distribution, permittivity, or conductivity of one or more fill materials 330 in the enclosure 315. The algorithms can be determined by empirical methods, by modeling, or by solving the inverse problem, a process known to those skilled in the art in which the field solutions are determined based on an estimate of the fill level 325 and/or material, the results are compared to the measured results, and a nonlinear global optimizer is used to refine the best estimate of the fill level and/or material in order to minimize the difference between the measured response and the simulated response.

In one or more embodiments, the fill material 330 may be a liquid that effectively shorts the transmission line 300, thus prohibiting response from one or more of the RFID integrated circuit chips 310 that are positioned below the fill level 325.

If the fill material 330 comprises one of two or more similar substances with similar electrical properties, such as cornflakes and oatmeal, the processor 345 may be able to tell the fill level but not distinguish between the similar substances. If the substances are different, such as liquid versus oatmeal or gravel versus oatmeal, the processor 345 may be able to distinguish the type of material 330 as well as the fill level 325 and/or volume.

Figure 4:
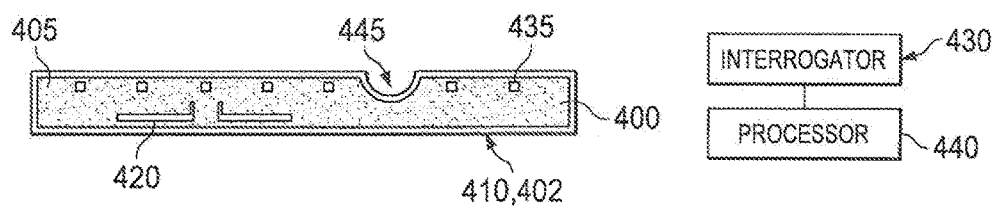
FIG. 4 depicts a schematic diagram in accordance with one or more embodiments described herein of an RFID-enabled cavity filled with foam and bounded by a conductive fabric exterior.

FIG. 4 depicts a schematic diagram of another embodiment described herein in which a cavity 405, at least partially filled with foam 400, is formed within a conductive fabric boundary 410. A fabric antenna 420 on the outside of the conductive fabric boundary 410 functions as a collector. An interrogator 430 sends an incident signal (not depicted in FIG. 4) to an antenna 420, generating an electromagnetic field in the cavity 405 with a coupling in the form of a cavity feed probe or aperture (not depicted in FIG. 4). The interrogator 430 receives reflected signals (not depicted in FIG. 4) containing identification information from one or more RFID integrated circuits 435 positioned within the cavity 405 and responding to the electromagnetic field. One or more depressions 445 in the cavity 405 acts as an influence on the electromagnetic field. The interrogator 430 measures the RSSI of the reflected signals and sends the RSSI measurements and the corresponding identification of the RFID integrated circuits 435 to a processor 440, within or in communication with the interrogator 430. The processor 440 may analyze information received from the interrogator 430 to deduce the location, or locations, at which the cavity 405 has the depressions 445.

In an alternate embodiment of the system of FIG. 4, the RFID integrated circuits 435, as they respond to the electromagnetic field in the cavity 405, measure the electromagnetic field strength and/or phase and send the measurements with their corresponding identification in response to the interrogator 430.

In yet another alternate embodiment of the present disclosure depicted in FIG. 4, a conductive layer 402 is formed by a conductive paint on the boundary 410, which comprises an inflatable structure. The conductive layer 402 of paint is continuous and contiguous for many applications, but some embodiments might allow for use of patterns of conductive paint. Fill material within the cavity 405 created by the inflatable structure comprises one or more gases. The temperature and pressure of the gas or gases exert an influence on the flexible conductive boundary 410 of the cavity 405 and thus affect an electromagnetic field distribution (not specifically depicted in FIG. 4 but represented in general previously as electromagnetic field 135 in FIG. 1) within the cavity 405, the electromagnetic field being generated by the antenna 420 in response to a signal from the interrogator. RFID integrated circuits 435 within the cavity 405 respond to the electromagnetic field and transmit the identification of the responding RFID integrated circuit(s) 435 in reflected signals to the interrogator 430, which measures RSSI of the reflected signals and sends the measurements to the processor 440. Alternatively, the strength and phase of the electromagnetic field is measured by the RFID integrated circuits 435, which transmit the measurements and the specific identification of each of the responding RFID integrated circuits 435 to the interrogator 430. The processor 440 in communication with the interrogator 430 can use the information received from the interrogator 430 to determine the volume of the gas or gases within the cavity 405, thus permitting solution for the pressure, assuming the temperature is known. If there is a depression 445 of the boundary 410, the depression 445 would act as an influence on the electromagnetic field and facts about the extent of the depression 445 could be determined by the processor 440 in analyzing the information received from the interrogator 430.

Figure 5:
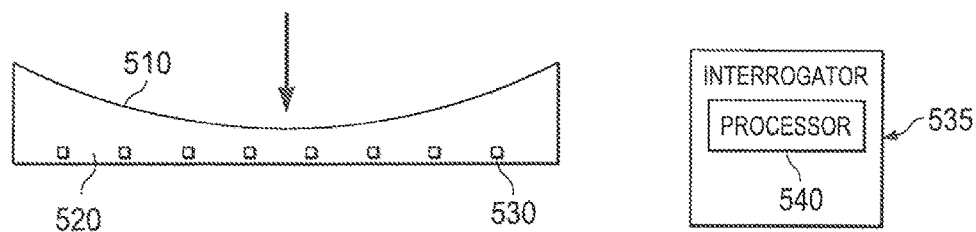
FIG. 5 depicts a schematic diagram in accordance with one or more embodiments described herein of an RFID-enabled conductive cavity in which a conductive, flexible diaphragm applies pressure to and reduces the volume of the RFID-enabled conductive cavity.

FIG. 5 depicts one or more embodiments of the present disclosure in which a conductive, flexible diaphragm 510 applies pressure to and reduces the volume of a conductive cavity 520, resulting in changes in an electromagnetic field (not depicted) within the cavity 520. An antenna (not depicted in FIG. 5) which receives an incident signal from an interrogator 535 and couples electromagnetic energy to the cavity 520, creating the electromagnetic field within the cavity 520. The electromagnetic field distribution within the cavity 520 is sensed by one or more RFID field sensors 530 within the cavity 520. The RFID field sensors 530 may respond with reflected signals, including identification of the responding RFID field sensors 530 to the interrogator 535. The interrogator 535 measures the RSSI of the reflected signals and sends the measurements and the corresponding identification of the responding RFID field sensors 530 as information to a processor 540, within or connected to the interrogator 535. The processor 540 uses the information to determine the pressure applied by the diaphragm 510. The processor 540 in FIG. 5 is depicted as being within the interrogator 535, but the processor 540 could also be in communication with the interrogator without being within the interrogator 535.

In an alternate variation of the embodiment of FIG. 5, the cavity width is designed to render the cavity 520 close to the cutoff frequency on that dimension. The degree to which the diaphragm 510 is depressed determines how far below cutoff the antenna is as a function of frequency. The interrogator 535 may communicate over a number of channels, each channel distinguished by a range of frequencies. The interrogator 535 may hop between alternative channels using a frequency-hopping spread spectrum technique, as is well known in the art. An RSSI associated with each RFID field sensor 530 is reported for the various frequencies used by the interrogator 535, thus providing information from which the extent and location of the volume reduction of the cavity 520 can be estimated.

Figure 6:
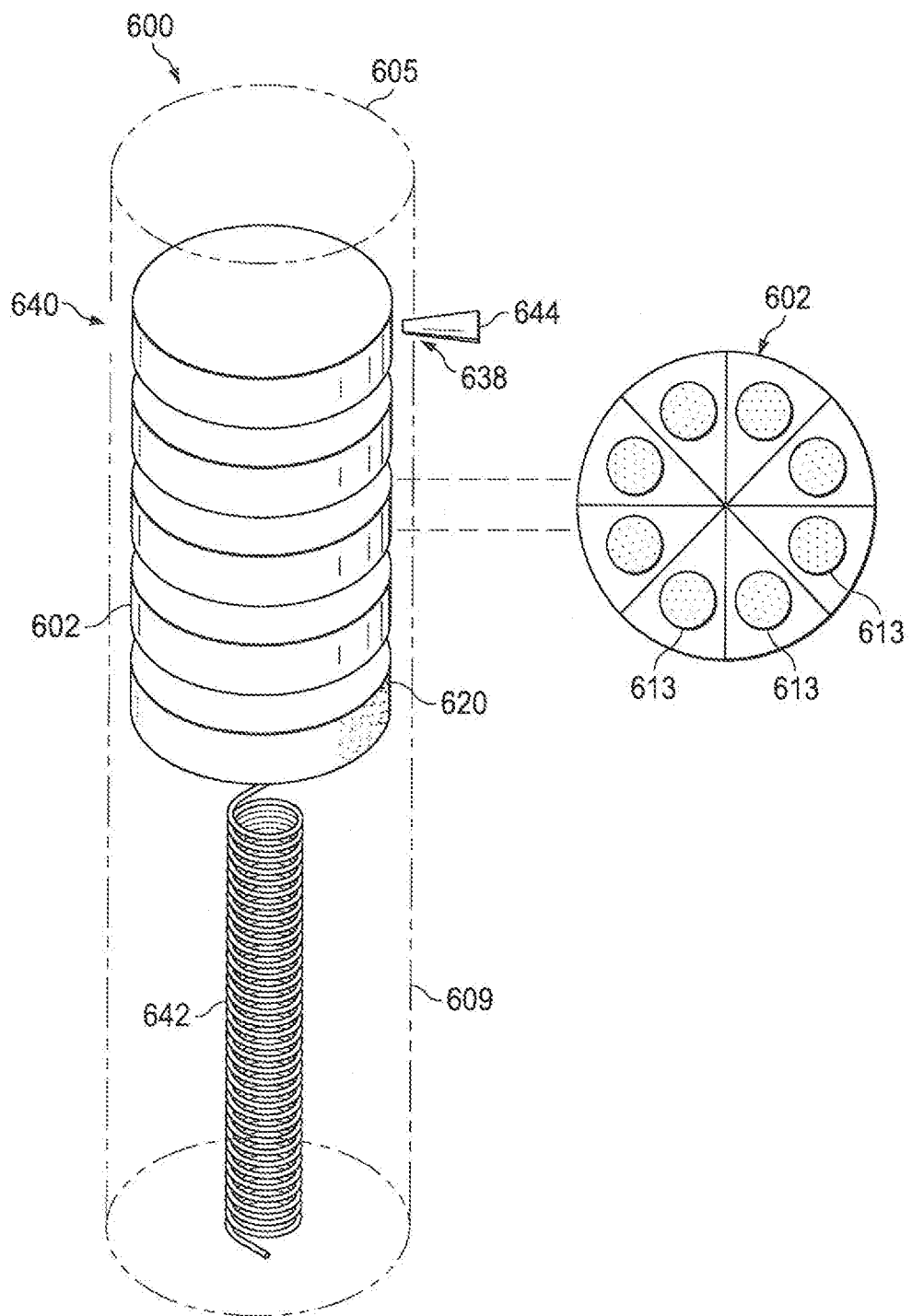
FIG. 6 is a schematic diagram of an RFID-enabled item dispenser having multiple items in each dispensed disc, in accordance with one or more embodiments described herein.

FIG. 6 will be discussed in more detail with FIG. 10 below.

Figure 7:
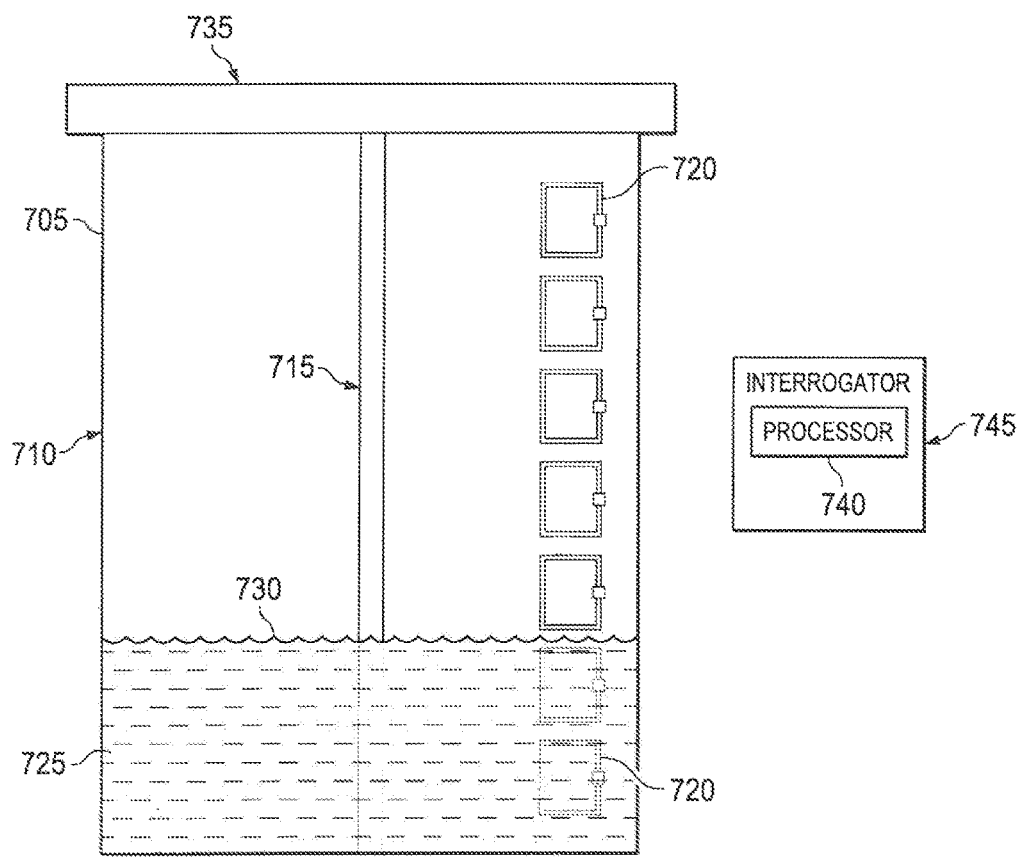
FIG. 7 depicts a schematic diagram in accordance with one or more embodiments described herein of an RFID-enabled container or dispenser having conductive walls and a conductive center post.

Referring now to FIG. 7, an enclosure in the form of a container or dispenser 710, with a quantity of N embedded RFID tags 720, enables sensing of fill material 725 and fill level 730. The container or dispenser 710 has an inner conductor 715 and conductive container walls 705. (The inner conductor in FIG. 7 is depicted as coaxial, but in other embodiments, the inner conductor may be offset. The enclosure and inner conductor may have a variety of cross sectional shapes, such as circular, triangular, rectangular, trapezoidal, or any other polygonal-shape.) A lid antenna 735 serves as a coupling and, stimulated by an incident signal from an interrogator 745, excites a coaxial waveguide formed by the container 710 and inner conductor 715 and generates an electromagnetic wave (not specifically depicted in FIG. 7). The electromagnetic wave travels down the waveguide and provides power to the quantity N RFID tags 720. The powered RFID tags 720 respond by transmitting their identification to the interrogator 745, which measures the RSSI and provides information comprising the RSSI measurements and the corresponding identification of the responding RFID tags to a processor 740, within or connected to the interrogator 745. The processor 740 may be configured to use the information received from the interrogator 745 to determine facts regarding the fill material 725 and fill level 730. Preferably, a reference RFID tag (not depicted in FIG. 7) resides on top of or within the lid antenna 735, or is placed somewhere on the exterior of the container 710. The reference signal strength is compared with that from the other responding RFID tags 720 within the waveguide in order to remove variations due to the exterior propagation channel between the interrogator 745 and the lid antenna 735. Although the bottom of the container or dispenser 710 (opposite the lid) presents a short circuit of the coaxial structure in the embodiment depicted in FIG. 7, in general, a matched or other suitable load can be used to terminate the waveguide. Material can be removed through the lid antenna 735 or, alternatively, from a dispensing mechanism (not shown). Alternatively, the lid and antenna can be on opposing ends of the container or dispenser 710.

Figure 8A:
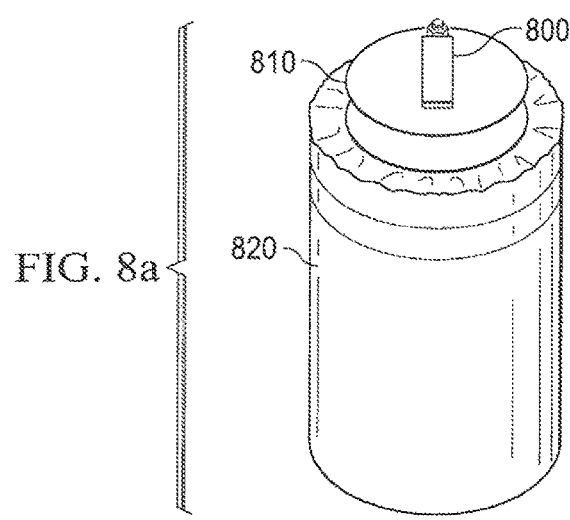
FIG. 8a is an illustration of an RFID-enabled container made in accordance with one or more embodiments described herein.

FIG. 8a is a diagram of an exterior of a prototype of another embodiment described herein. In FIG. 8a, a reference RFID tag 800 is fastened to the top of a container lid antenna 810, which may comprise a capacitively-fed planar inverted F antenna ("PIFA"). A container wall 820 also serves as the outer conductor of a coaxial waveguide in FIG. 8a. An inner conductor (not shown in FIG. 8a) protrudes through the lid 810, with isolation to prevent shorting to the lid 810, and makes contact with a capacitive feed plate (not visible in FIG. 8a). The container is filled with oatmeal, an example of a fill material. An interrogator (not visible in FIG. 8a) sends an incident signal to the container lid antenna 810, which generates an electromagnetic field. One or more field RFID tags (not depicted in FIG. 8a), each having identification information, are placed on the internal side (not visible in FIG. 8a) of the container outer conductive wall. The field RFID tags and the reference RFID tag 800 respond to the electromagnetic field, transmitting their identifications via the container lid antenna 810 to the interrogator. The interrogator measures the RSSI of the transmissions from the responding RFID tags and sends information including the measurements and the identification of the corresponding responding RFID tags for recordation and analysis by a processor (not visible in FIG. 8a) within or in communication with the interrogator. The processor uses the recorded information to determine the quantity of oatmeal within the container 820. Measurements of responses from the RFID reference tag 800 may be compared to measurements of responses from the responding field RFID tags to identify and remove extraneous variations not related to the influences on the electromagnetic field.

Figure 8B:
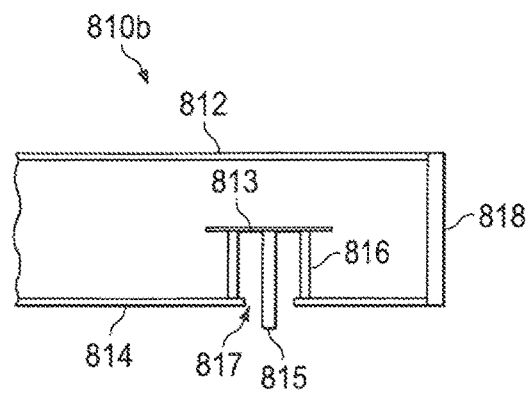
Figure 8C:
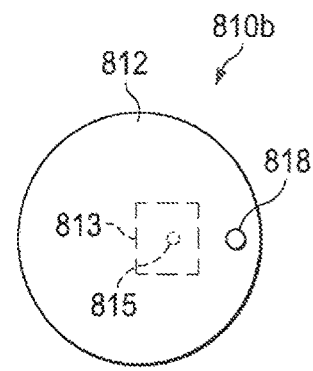

FIGS. 8b, 8c, 8d and 8e are diagrams showing additional details of a capacitively-fed planar inverted F antenna ("PIFA"), such as the antenna 810, which could be used with embodiments described herein similar to the one pictured in FIG. 8a. As depicted in FIG. 8b, which provides a side view of the lid antenna, the lid antenna 810b comprises a top plate 812, a capacitive feed plate 813, and a ground plate 814, with a shorting strip 818 connecting the top plate 812 to the ground plate 814. A feed post 815 attached to the capacitive feed plate 813 passes through an opening in the ground plate 814 and extends into the cavity of container 820e. The feed post 815 is provided with an insulating standoff 816 from the body of the antenna 810b at a clearance 817. FIG. 8c provides a top view of the lid antenna 810b, the top plate 812 and the shorting strip 818.

Figure 8D:
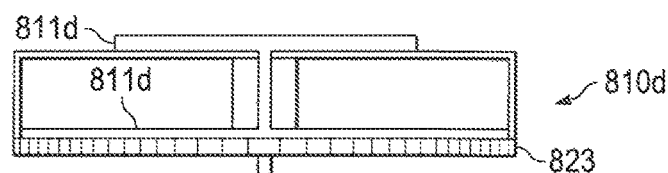
Figure 8E:
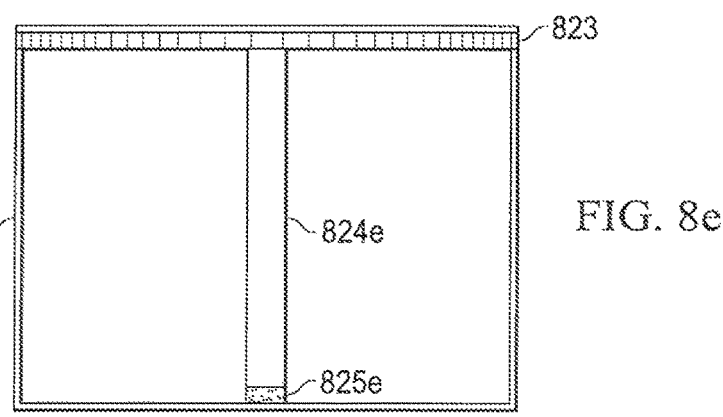

FIG. 8d and FIG. 8e depict a patch lid antenna 810d for a coaxial feed to an embodiment of the present disclosure comprising an RFID-enabled container 820e with conductive walls 822e. FIG. 5d depicts a patch lid antenna 810d with top and bottom layers 811d and a feed post 815d (which may also be called a "center post"). Optional threads 823 may be used to couple the lid antenna 810d to the container 820e. As depicted in FIG. 8e, within the container 820e, the feed post 815d may be received by an insulating center post guide 824e terminating in a conductive termination pad 825e.

Figure 9:
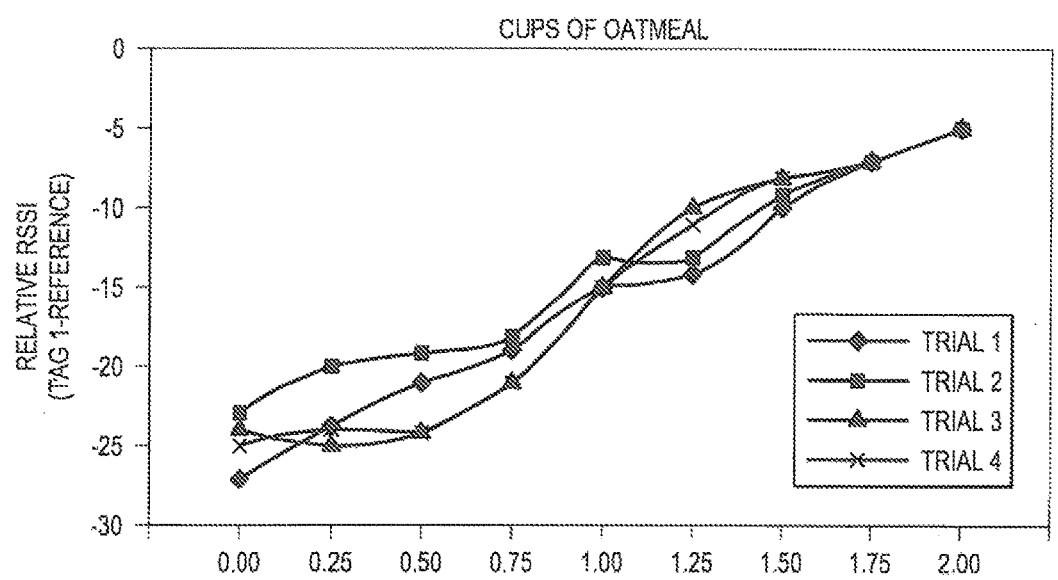

FIG. 9 depicts a graph of results of four different trials using the prototype of FIG. 8a. As discussed above, for each trial, when the interrogator sends an incident signal to the container lid antenna 810, the container lid antenna 810 receives an electromagnetic field. The interrogator measures RSSI from signals sent by RFID tag 1 and the reference tag and sends the measurements and identification of the corresponding RFID tags 800 to the processor. For each trial, the container 820 is removed from its position near the interrogator, emptied, and then filled with oatmeal to the level indicated on the X-axis and a new trial is run. For this prototype, no attempt was made to maximize the power passed from the container lid antenna 810 to the container 820, nor was any attempt made to equalize the sensitivity for different depths of fill material. Note how the trial lines vary somewhat at lower levels of cups of oatmeal, but the trial plots converge more closely as the cups of oatmeal increase. This convergence indicates that in these tests, this particular prototype is more accurate for higher fill levels than for lower level fills. However, the prototype serves the purpose of monitoring the fill level of a container 820 or dispenser. No batteries are required, and a single interrogator may remotely monitor a wide angular span of different containers or dispensers.

The embodiments described herein permit moderate to very fine resolution RFID tracking. A pill dispenser is an example of an application that would require fine resolution RFID tracking. Pills are typically too small for secure attachment of conventional RFID tags. In addition, accidental ingestion of RFID tags might not be beneficial for the patient. Furthermore, the tag cost would likely be prohibitive for attachment at the pill level.

Figure 10:
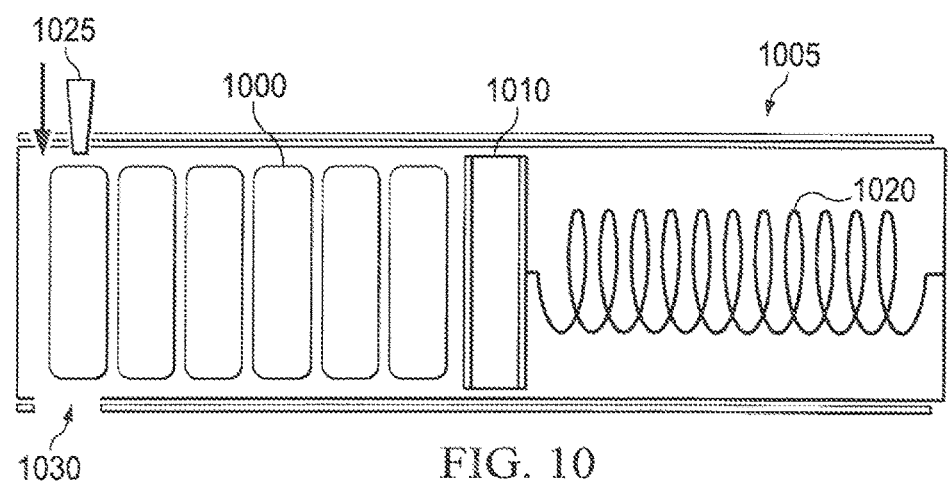
FIG. 10 is a schematic diagram of a spring-operated item dispenser.

Referring now to FIG. 10, a schematic of a conventional dispenser, such as a pill dispenser, is shown. The items 1000 to be dispensed, which may be pills or other small items, from a dispenser 1005 are placed on top of or adjacent to a traveler 1010, which compresses a spring 1020. Items 1000 can be removed by a plunger 1025 which pushes one of the items 1000 through an opening 1030. Spring tension in the compressed spring 1020 pushes the traveler 1010 and items 1000 forward to fill the vacated slot.

FIG. 6 is a schematic diagram depicting an RFID-enabled dispenser 600 that would be placed in a holder (not depicted in FIG. 6) having one or more cells (not depicted in FIG. 6). The RFID-enabled dispenser of FIG. 6 could be used as part of embodiments of the present disclosure like those depicted in FIGS. 11-19 herein, which are discussed in more detail below. The dispenser 600 may have a cylindrical structure 609, with a circular cross-section 605. A traveler 620 positioned by a spring 642 moves items 602, which can be pushed by a plunger 644 (acting through a first opening 638) through second opening 640. The items 602 might comprise disks containing one or more individual objects 613. The disc 602 depicted in the inset of FIG. 6 is segmented in a pie fashion, with an object 613 in each segment, but the item 602 may comprise any kind of convenient or desired type of packaging and may have shapes other than that of a disc. Items comprising a package containing a plurality of objects may be used with various embodiments of the RFID-enabled item dispenser of the present disclosure.

Figure 11:
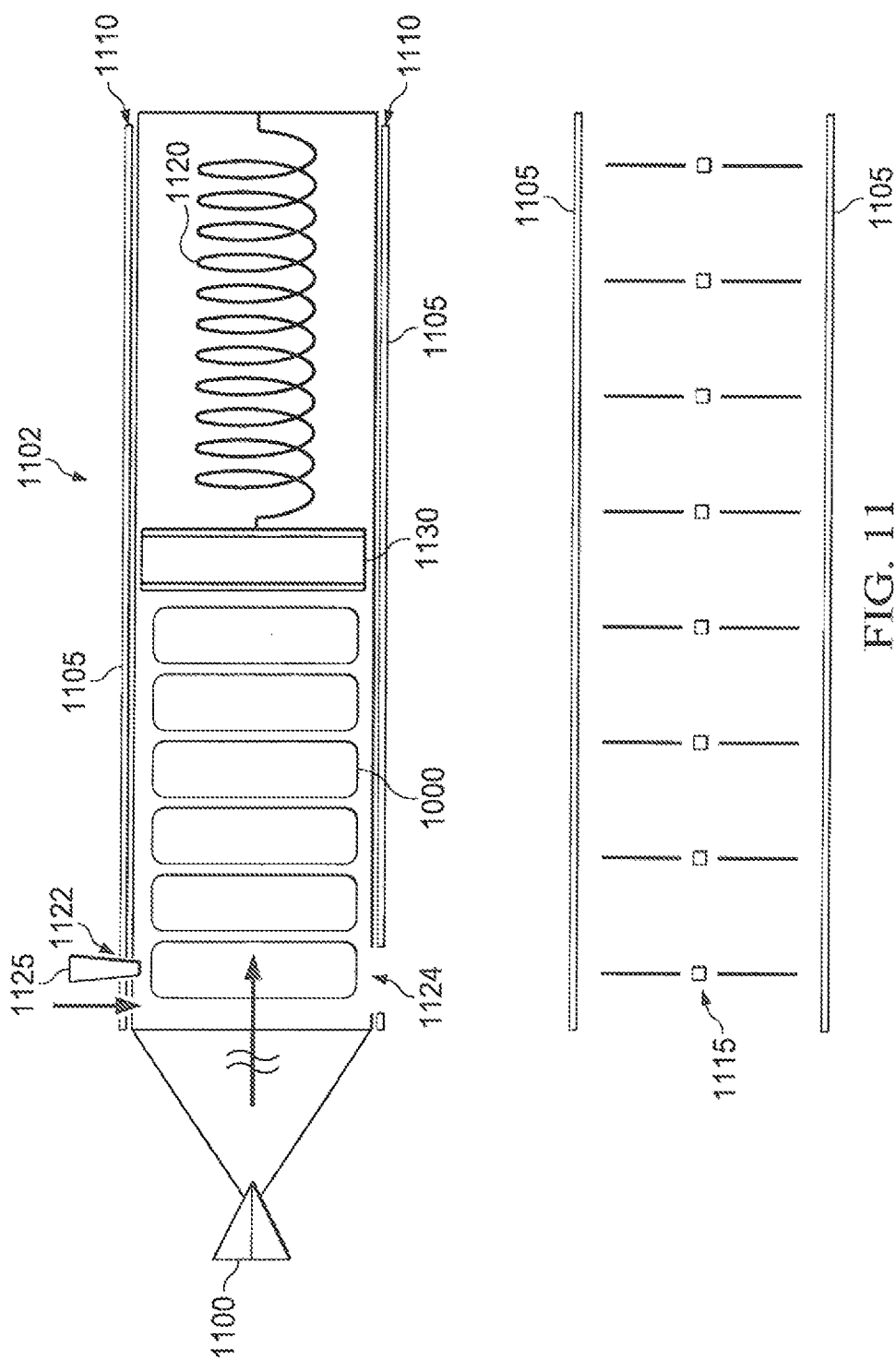
FIG. 11 is a schematic diagram of the item dispenser of FIG. 10, modified to be an RFID-enabled item dispenser having an enclosure in the form of a parallel plate waveguide, in accordance with one or more embodiments described herein.

FIG. 11 is an exploded view of a modified version of the dispenser of FIG. 10, wherein additional components are included to create an embodiment of the present disclosure, an RFID-enabled dispenser. As in FIG. 10, the items 1000 to be dispensed are placed on top of or adjacent to a traveler 1130, which compresses a spring 1120. But the RFID-enabled dispenser 1102 of FIG. 11 has additional components which include a collector 1100, such as an antenna, conductive layers 1105 to form a waveguide, such as a parallel plate waveguide 1110 (the parallel plates of the parallel plate waveguide comprising the conductive layers 1105), and one or more RFID sensors 1115. The RFID sensors 1115 are positioned on one or both sides of the parallel plate waveguide 1110 such that the ends establish electrical connection to the waveguide conductive layers 1105. The conductive layers 1105 are typically solid but specialized applications may permit the use of patterned conductive layers. The RFID sensors 1115 could be placed intermittently or periodically along the axial direction of the waveguide 1110. An interrogator, not depicted in FIG. 11, sends an incident signal to the collector 1100, creating an electromagnetic field in the waveguide 1110. The RFID sensors 1115 may respond to the electromagnetic field and send information including their identification as reflected signals to the interrogator. The interrogator measures the RSSI of the reflected signals and transmits information comprising the measurements and corresponding RFID sensor identification to a processor within or in communication with the interrogator. The processor records and/or analyzes the information received from the interrogator and may determine data concerning the items 1000 to be dispensed, such as the number of items already dispensed and/or the number of items remaining in the dispenser 1102 and possibly the type or material of the items 1000. A first opening 1122 in one waveguide plate permits a plunger 1125 to move forward, and a second opening 1124 in the opposing waveguide plate permits items 1000 to be dispensed. Both the first opening 1122 and the second opening 1124 are sufficiently small to not disrupt continuity of the conductive waveguide 1110. Alternatively, the first and second openings 1122, 1124 may be located on the two sides orthogonal to the conductive waveguide plates, in which case an RFID sensor 1115 would be positioned so as not to interfere with the plunger 1125 or block the dispenser opening. As an alternative to a plunger 1125, other dispensing mechanisms could be used to dispense items from the dispenser 1102.

In a variation of the embodiment of FIG. 11, the traveler 1130 may be modified from a conventional form to have one or more conductive surfaces, or to be predominantly conductive, so as to present an electromagnetic short to the waveguide 1110. The position of the modified traveler 1130, and hence the short, affects the wave pattern of the electromagnetic field and hence the RSSI, and possibly phase measurements, from each of the one or more RFID sensors 1115. For example, the one or more conductive surfaces could short one of the adjacent RFID sensors 1115. Alternatively, the one or more conductive surfaces could enable one of the RFID sensors 1115 by establishing the proper impedance presented by the RFID sensor 1115 to the waveguide. The processor, upon receiving the information from the interrogator, determines the quantity of the items 1000 remaining in the RFID-enabled dispenser 1102, and possibly the type or material of the items 1000.

In another version of the embodiment of FIG. 11, an RFID sensor 1115 is embedded into the traveler 1130 such that the traveler 1130 absorbs incident energy from the incident signal, providing a different type of load to the waveguide 1110 and an RSSI value (and possibly phase) corresponding to the terminal end of the waveguide 1110. The position of the traveler 1130 would be determined from RSSI measurements made by the interrogator from signals carrying identification information sent by the responding RFID sensors 1115 to the interrogator. (Alternatively, in some embodiments, the RFID sensors 1115 may measure an electromagnetic field created by the configuration of the embodiment and transmit the RSSI measurements to the interrogator.) In another embodiment, the traveler 1130 is designed to present a predetermined, but arbitrary, electromagnetic load.

Figure 12:
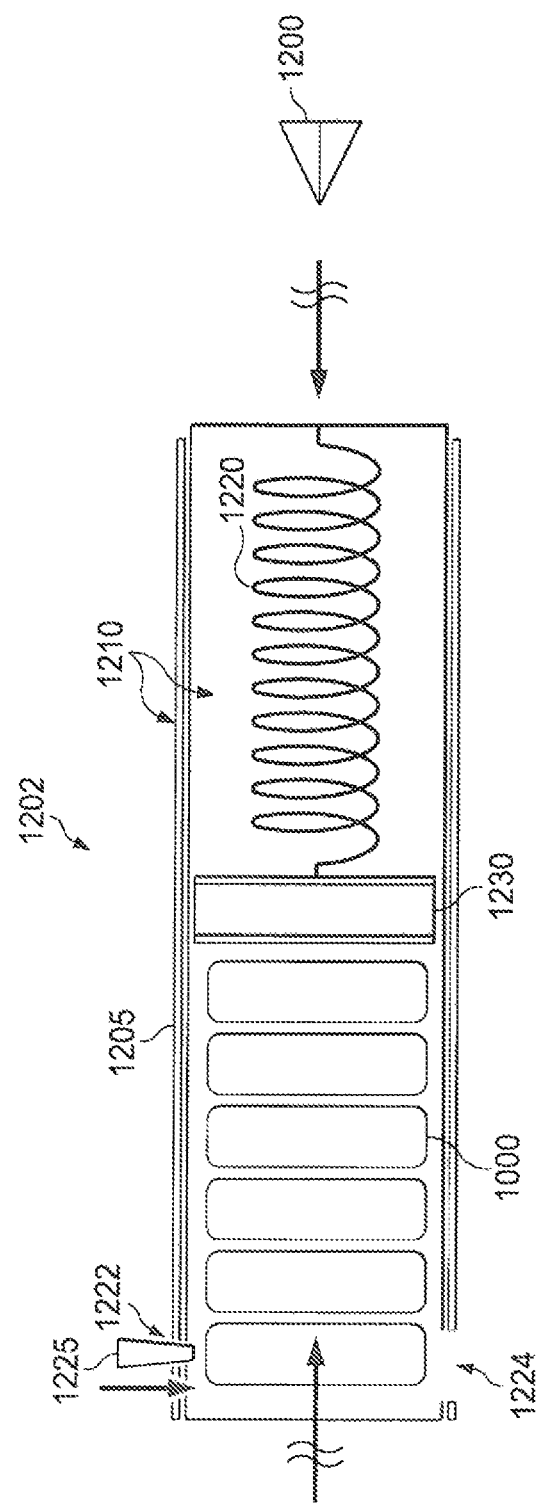
FIG. 12 is a schematic diagram of an RFID-enabled item dispenser having an enclosure in the form of a coaxial waveguide, in accordance with one or more embodiments described herein.

FIG. 12 depicts one or more embodiments of the present disclosure in the form of a dispenser 1202 in which the collector 1200 provides an input signal to a spring end of the waveguide 1210 (on the opposite side compared to FIG. 11). The waveguide of FIG. 12 is a type of coaxial waveguide 1210 with the spring 1220 serving as a center conductor and exerting a force to traveler 1230.

In a variation of the embodiment of FIG. 12, the surrounding structure constitutes a parallel plate waveguide, while in another version the structure constitutes a fully enclosed conductive cylinder 1205, of arbitrary shaped cross-section. For the parallel plate embodiment, one or more RFID sensors (not depicted in FIG. 12) having individual identification information would be positioned along one or both gaps between the parallel plates. For the fully enclosed cylinder embodiment, the RFID sensors would be positioned in the internal volume or at the entry/exit plane of the waveguide.

In each version of the embodiment of FIG. 12, an interrogator (not depicted) sends an incident signal to the collector 1200, which generates an electromagnetic field. The RFID sensors which respond to the electromagnetic field send their identification information via the collector 1200 to the interrogator, which measures the RSSI and sends the measurements and corresponding identification information to a processor, within or in communication with the interrogator, for analysis. (Alternatively, the RFID sensors make measurements of the electromagnetic field and send the measurements and the responding RFID sensors' identification as reflected signals via the collector 1200 to the interrogator.) The processor uses the measurements and sensor identification information to determine the amount or type of items within the dispenser and/or the number of items which have been dispensed.

Figure 13:
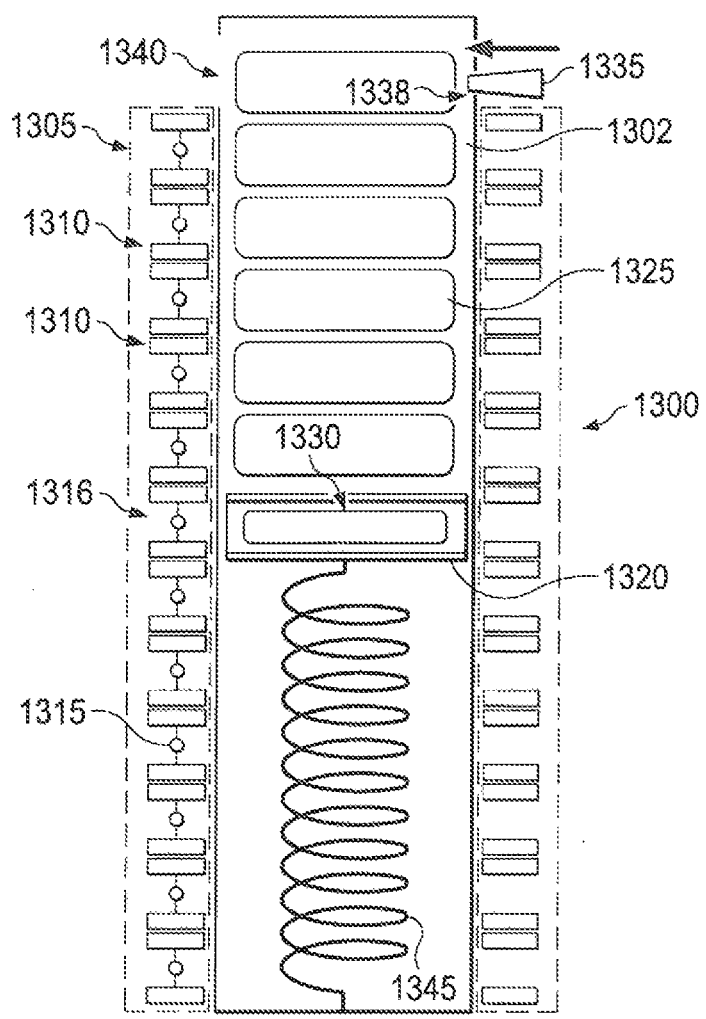
FIG. 13 is a schematic diagram of an RFID-enabled item dispenser in accordance with one or more embodiments described herein, wherein a traveler contains a dielectric body within.

FIG. 13 depicts a cross-section of a fine resolution RFID dispenser assembly 1300 in accordance with another embodiment described herein. In FIG. 13, a dispenser 1302, with items 1325 to be dispensed within, is placed within a holder 1305, which comprises an elongated structure with multiple holder cells 1310, each holder cell 1310 containing an RFID circuit 1315 with an individual identification. The holder cells may comprise but are not limited to parallel plate cells. A plunger 1335, acting through a first opening 1338, pushes an item 1325 to be dispensed through a second opening 1340. A traveler 1320 contains a dielectric body 1330 within and is connected to a spring 1345, operating similarly as in FIGS. 11 and 12. The position of the traveler 1320 is determined by the number of items 1325 remaining within the dispenser 1300. The position of the traveler 1320 and its dielectric body 1330 enables one of the RFID holder cells 1316 to be energized in that it receives signals from an interrogator (not depicted) and responds to the signals. The interrogator and a processor within or in communication with the interrogator, upon receiving the unique ID code of the responding RFID circuit in the energized RFID holder cell 1316, are able to deduce the number of items 1325 remaining within the dispenser. (In alternate embodiments, all holder cells except one could be energized by an appropriate design, and the number of items remaining in the dispenser could be deduced by the interrogator and an appropriately programmed processor by determining the identity and thus the location of the non-responding holder cell).

Figure 14:
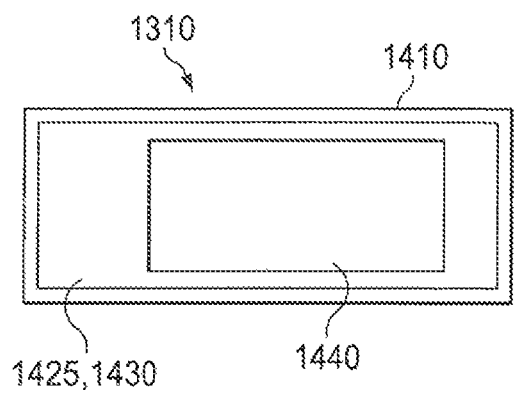
FIG. 14 is a schematic diagram of an embodiment of the holder cells of FIG. 13.

Details of the holder cells of FIG. 13 are provided in FIG. 14. Each holder cell 1310 comprises a top floor 1410 and bottom floor (not visible in FIG. 14), each with a corresponding conductive pattern 1425, 1430. The top and bottom floor conductive patterns 1425, 1430 may be identical. The interior sections 1440 of the floors are hollow in order to support the dispenser 1302 body (not depicted in FIG. 14).

Figure 15:
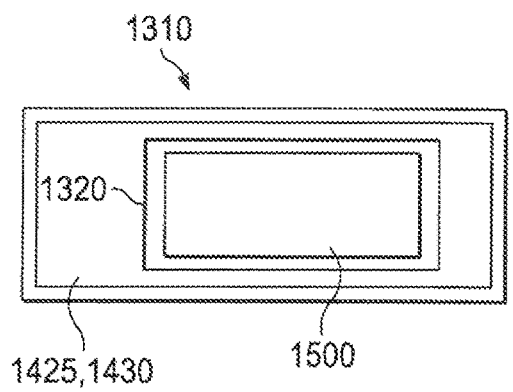
FIG. 15 is a schematic diagram of another embodiment of the holder cells of FIG. 13, illustrated with a traveler, having a conductive pattern, within the holder cell.

FIG. 15 is a schematic diagram depicting a holder cell 1310 and a resulting conductive pattern 1500 from the traveler 1320 when the traveler 1320 moves within the structure of a holder cell 1310, in accordance with one or more embodiments described herein. Referring back to FIG. 13, note that the convergence of the dielectric body 1330 of the traveler 1320 with the conductive patterns 1425, 1430 of the holder cell 1310 energizes an RFID circuit (not depicted in FIG. 15) within the holder cell 1310.

Figure 16:
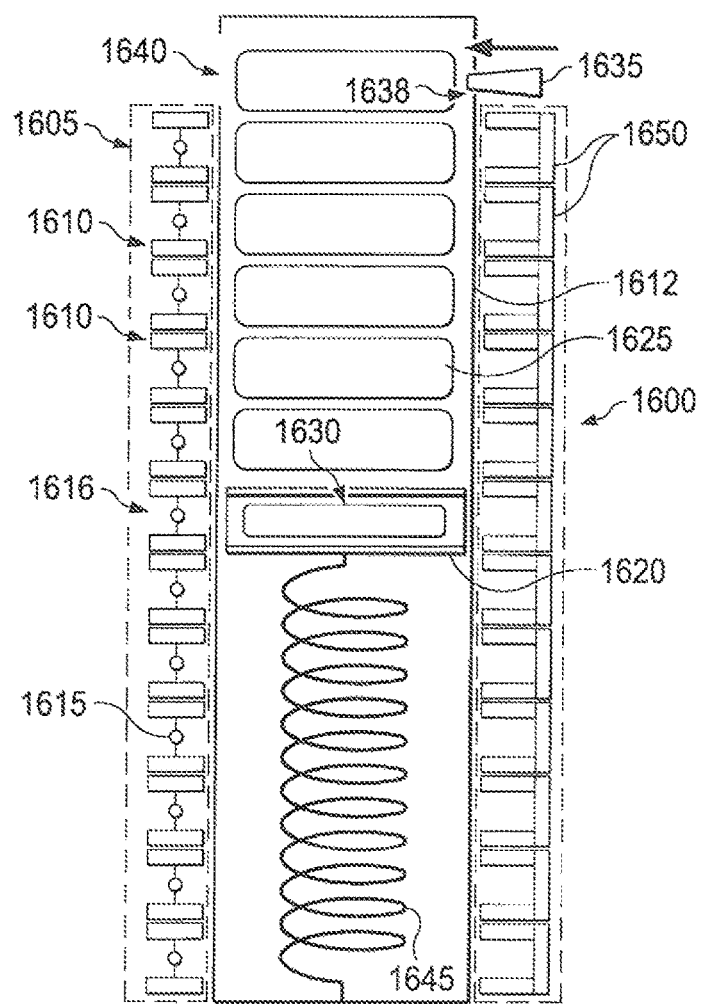
FIG. 16 is a schematic diagram of an RFID-enabled item dispenser in accordance with one or more embodiments described herein, having holder cells on two sides of the dispenser, with an electromagnetic short on one side of the holder cells.

FIG. 16 depicts one or more embodiments of an RFID enabled dispenser 1600 in accordance with the present disclosure. Similar to the embodiment depicted in FIG. 13, the dispenser 1600 comprises a dispensing chamber 1612, with items 1625 to be dispensed within, placed within a holder 1605. The holder 1605 comprises an elongated structure with multiple holder cells 1610, each holder cell 1610 containing an RFID sensor 1615 with a unique identification. A plunger 1635 is designed to act through a first opening 1638 to push an item 1625 to be dispensed through a second opening 1640. A traveler 1620 contains a dielectric body 1630 within and compresses a spring 1645, operating similarly as in FIGS. 11-13. The position of the traveler 1620 is determined by the number of items 1625 remaining within the dispenser 1600. Unlike FIG. 13, in FIG. 16, an electromagnetic short 1650 on one end of the holder cells 1610 functions to reduce the physical size of the holder cell 1610 required for resonance, such as a quarter-wave patch antenna or a planar inverted-F antenna (PIFA). The position of the traveler 1620 and its dielectric body 1630 enables one of the holder cells 1610, a RFID holder cell 1616 that is energized, to function as an operable antenna at the frequency of operation, and hence enables the RFID sensor in the energized holder cell 1616 to receive signals from an interrogator (not depicted) and to respond to the signals. The interrogator and a processor within it, upon receiving the unique ID code of the responding RFID sensors 1615, are able to deduce the number of items 1625 remaining within the dispenser 1600.

Figure 17:
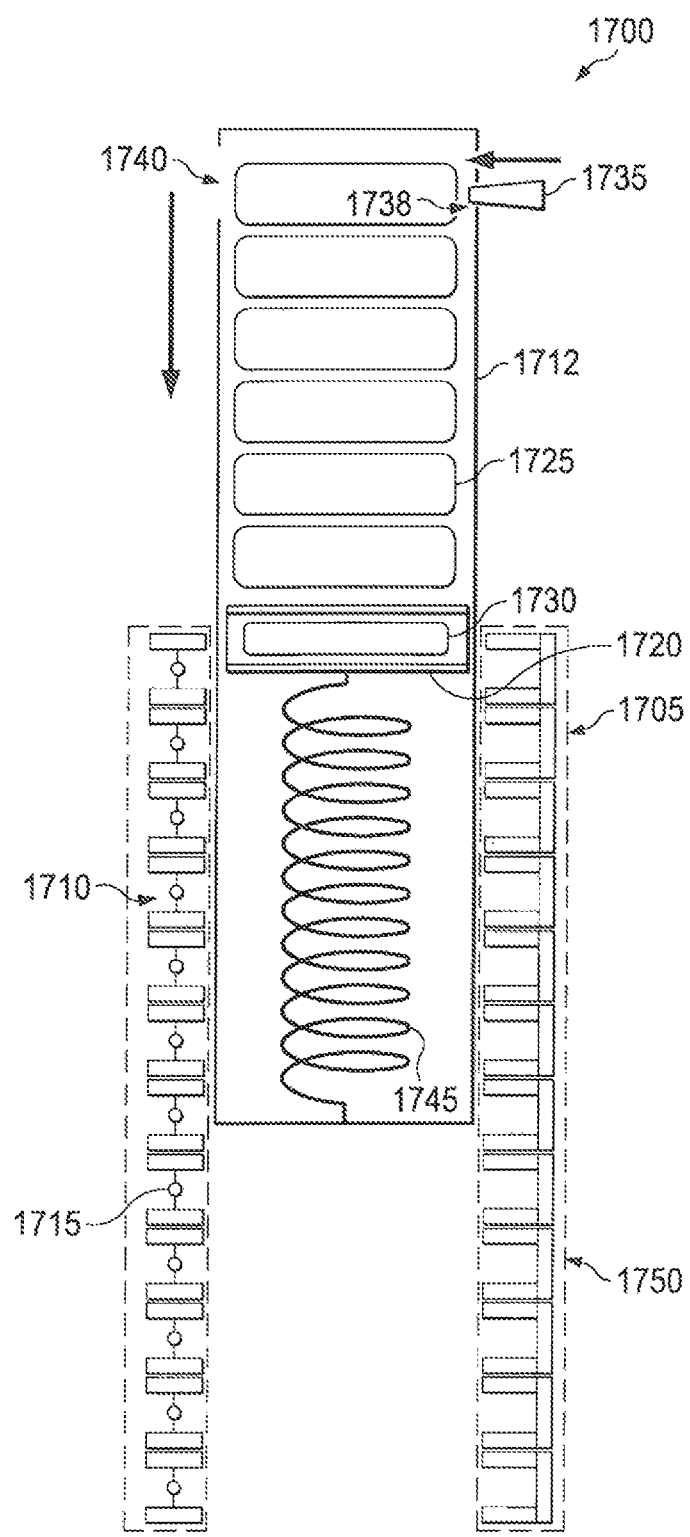
FIG. 17 is a schematic diagram of an RFID-enabled item dispenser with the dispensing component outside of the holder in accordance with one or more embodiments herein.

FIG. 17 depicts one or more embodiments of an RFID enabled dispenser 1700 in accordance with the present disclosure. In structure and operation, the embodiment in FIG. 17 is similar to that of FIGS. 13 and 16. The dispenser assembly 1700 includes a dispensing chamber 1712, with items 1725 to be dispensed, placed within a holder 1705. The holder 1705 comprises an elongated structure with multiple holder cells 1710, each holder cell containing an RFID sensor 1715 with a unique identification. A plunger 1735 is designed to act through a first opening 1738 to push an item 1725 to be dispensed through a second opening 1740. A traveler 1720 contains a dielectric body 1730 within and compresses a spring 1745, operating similarly as in FIGS. 11-13 and 16. The position of the traveler 1720 is determined by the number of items 1725 remaining within the dispenser 1700. As with the embodiment of FIG. 16, an electromagnetic short 1750 on one end of the holder cells 1710 functions to reduce the physical size of the holder cell 1710 required for resonance, such as a quarter-wave patch antenna or a planar inverted-F antenna (PIFA). The position of the traveler 1720 and its dielectric body 1730 enables one of the holder cells 1710 to function as an operable antenna at the frequency of operation, and hence enables the RFID sensor in the energized cell to receive signals from an interrogator (not depicted) and to respond to the signals. In the embodiment of FIG. 17, the dispensing chamber 1712 of the RFID enabled dispenser 1700 is separable from the holder 1705, as depicted.

FIG. 18 illustrates another embodiment in which a remote RFID reader (also called an interrogator) 1800 interrogates an RFID-enabled dispenser 1805, and only a single active RFID holder cell 1810, determined by a traveler 1815 position, responds. A holder 1820 comprises a collection of holder cells 1825, each of which may comprise any of a number of types of antennas, including but not limited to half-wave microstrip patches, quarter-wave patches, and PIFAs. Each holder cell 1825 contains an RFID sensor 1830. When the traveler 1815, positioned by a spring 1816, moves to the location of the representative holder cell 1810, that holder cell 1810 is energized, that is, suitably tuned or enabled as an antenna to receive energy from the interrogator 1800, transfer energy to the particular RFID sensor 1812 operatively connected to the energized holder cell 1810, and re-radiate energy from the RFID sensor 1812 to the interrogator 1800. When the traveler 1815 is not positioned within the location of the holder cell 1810, holder cell 1810 is not conducive to transferring energy from the collector means to the RFID sensor 1812 associated with this particular holder cell. When the traveler 1815 is within the location of the holder cell 1810, this particular holder cell 1810 activates and sends signals back to the interrogator 1800 for analysis by a processor (not separately depicted in FIG. 18) within or in communication with the interrogator 1800. Based on the RFID sensor 1812 that responds, the processor can determine the position of the traveler 1815 and hence the quantity of items 1835 remaining within the dispenser 1805 (or the quantity of items which have been dispensed). As with the embodiments of FIGS. 13 and 16, a plunger 1845 acts through a first opening 1838 to push an item to be dispensed through a second opening 1840.

To augment the effect of the traveler 1815 residing within the holder cell 1810; i.e. to enhance the ability of the energized holder cell 1810 to couple energy to the RFID sensor 1812 that shares the same holder cell 1810 as the traveler 1815, the structural body of traveler 1815 might include an enhanced coupler. Examples of possible enhanced couplers include but are not limited to a high dielectric body that tunes (1) the resonant frequency of the holder cell 1810 so as to be functioning as an antenna; (2) the impedance of the holder cell 1810 to match that of a collector; or (3) the resonance of the energized holder cell 1810 to affect the cavity impedance response of the holder cell 1810. In another embodiment, the traveler 1815 might comprise a top conductive pattern and a bottom conductive pattern with an insulator in the middle. In yet another embodiment, the traveler 1815 might comprise a short between the top and bottom conductive patterns, in which the short tunes the holder cell 1810 as the traveler 1815 enters.

Communication protocols organize exchanges of information between devices. The response of the RFID sensors within the holder cells functioning as an antenna of FIG. 18 may follow such a communication protocol, with the interrogator also following the same protocol. One such protocol is the EPCglobal Class 1 Generation 2 protocol.

Figure 19A:
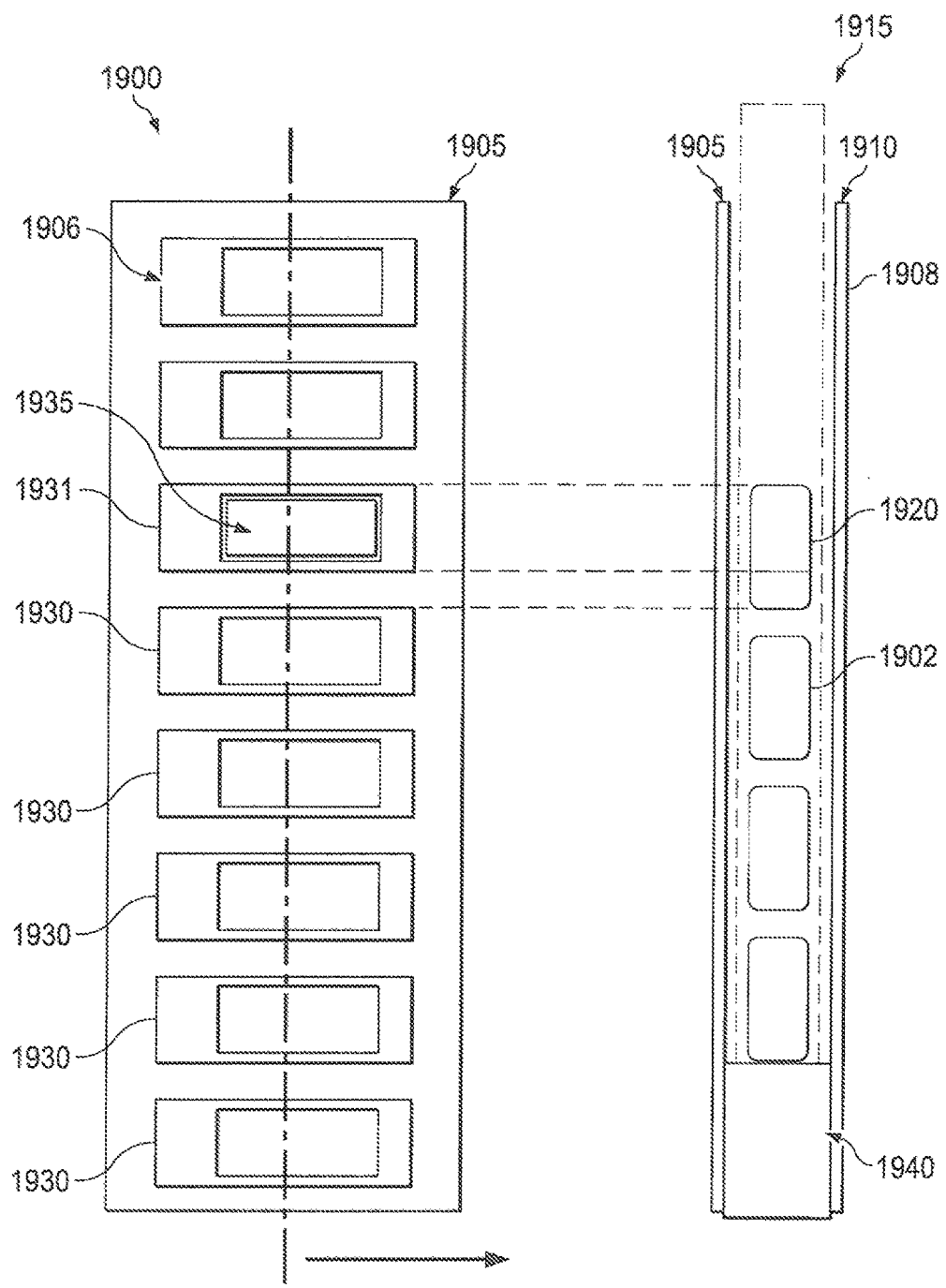
FIG. 19a is a schematic diagram of an RFID-enabled item dispenser, depicting an end view cross section of a dispenser unit, in accordance with one or more embodiments described herein.

FIG. 19*a* is a combined front and side view of another embodiment described herein in which an RFID-enabled item dispenser 1900 dispenses items 1902. A first half 1906 of conductive cell patterns are formed on a first printed circuit board (a first PCB) 1905 and a second half 1908 of the conductive cell patterns are formed on an opposing (or "back") side (a second PCB) 1910 with a dispenser unit 1915 between the first and second PCBs 1905, 1910. Similar to previous embodiments described above, a traveler 1920 enables communications to and from an RFID circuit (not depicted in FIG. 19*a*) within a particular cell 1931 of the holder cells 1930 formed by the first and second halves of the conductive patterns 1906, 1908. A top conductive pattern 1935 on the traveler 1920, possibly in conjunction with a dielectric body, enables the particular cell 1931 hosting the traveler 1920 to receive and send RFID signals from/to the interrogator. (As the traveler changes position, other holder cells would become activated.)

Continuing to refer to FIG. 19*a*, the conductive patterns 1906, 1908 on the first and second PCI's 1905, 1910 might be different; e.g., the first half of the conductive pattern 1906, on the first PCB, might be characterized with one or more empty regions, whereas the second half 1908 of the conductive pattern, on the second PCB 1910, might be a single filled conductive region. In other embodiments, the conductive patterns 1906, 1908 might be identical.

FIG. 19*a* also depicts a dispenser door 1940 at the base of the dispenser 1900. Although other embodiments discussed herein have indicated a spring that presents a force to propel the traveler 1920, other mechanisms (called "forcing elements" herein) might be used to propel the traveler 1920, such as (but not limited to) gravity (as depicted in FIG. 19*a*), levers, masses placed above the traveler 1920 in the presence of gravity, or gears.

In a variation of the embodiment depicted in FIG. 19*a*, the second PCB 1910 does not contain the second half of the conductive pattern 1908. Instead, an additional conductive pattern is placed on the back side of the traveler 1920. In various embodiments, the traveler may have a conductive pattern on one side and solid metal on the other or the traveler may have solid metal on one side and a dielectric on the other or both sides of the traveler may have conductive patterns. In one or more embodiments of the present disclosure, the traveler may have a side with a solid metal and one of the PCB's may have a continuous ground plane. When the traveler rests in a holder cell functioning as an antenna, the traveler shorts out the holder cell, deactivating it and its operation as an antenna. As other holder cells are activated, the location of the de-activated holder cell provides the location of the traveler and thus discloses the number of items contained in the dispenser.

Figure 19B:
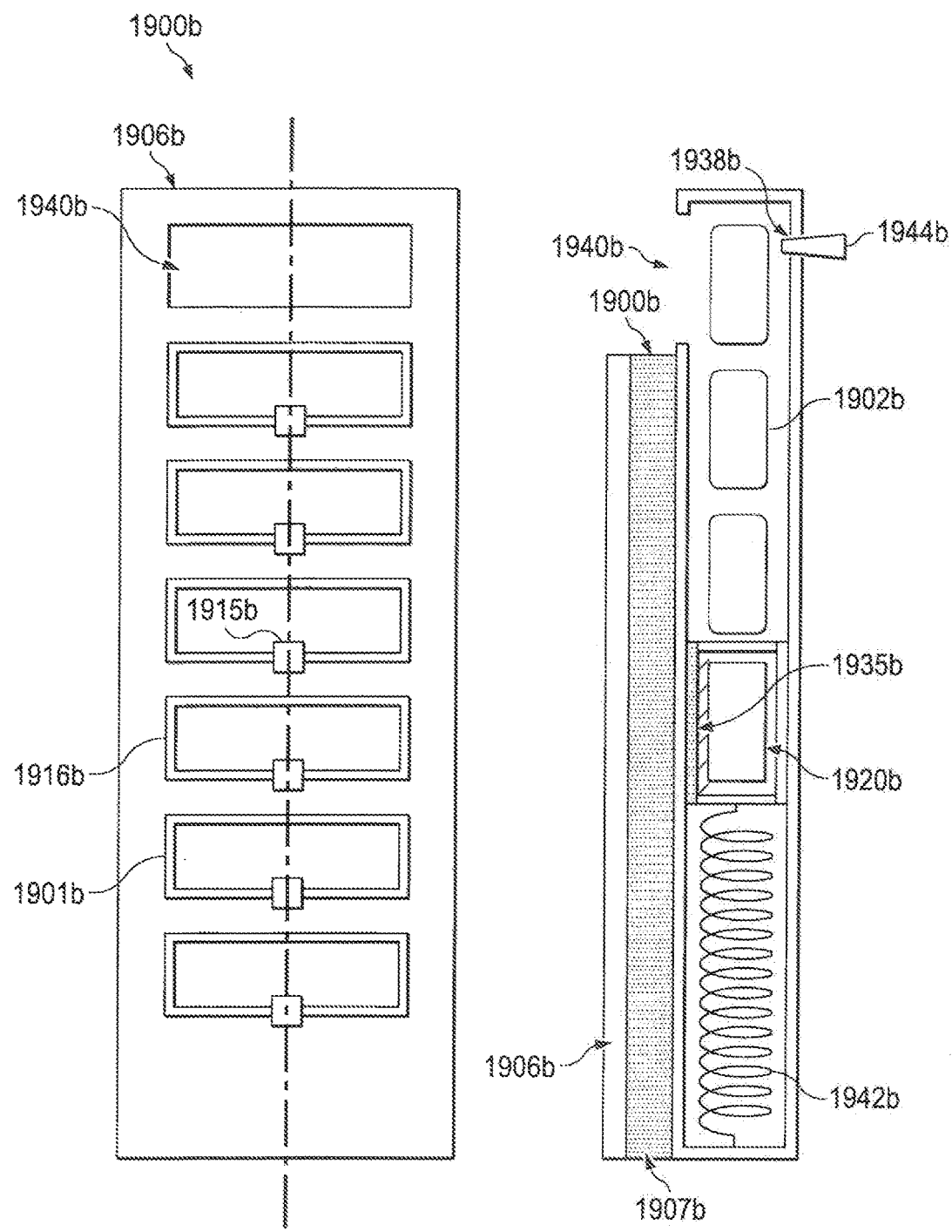
FIG. 19b is a schematic diagram of an RFID-enabled item dispenser in which a top conductive layer comprises a top circuit having one or more ring microstrip antenna cells, in accordance with one or more embodiments described herein.

FIG. 19*b* is a schematic diagram depicting one or more embodiments of the present disclosure in the form of an RFID-enabled item dispenser 1900*b* in which a top conductive layer 1906*b* comprises one or more ring microstrip antenna circuits 1901*b*, each of which is attached to an RFID sensor 1915*b*. As the terms are used with respect to FIG. 19*a*-19*f*, a "conductive layer" is not necessarily a solid conductive layer. The top conductive layer 1906*b* is conductive in the sense that it includes the ring microstrip antenna circuits or other antenna pattern; it does not have to be a solid conductive layer. The ring microstrip antenna circuits 1901*b* may be rectangular, as depicted in FIG. 19*b*, circular, triangular or have some other configuration. The top conductive layer 1906*b* is attached to a dielectric layer 1907*b*. A traveler conductive layer 1935*b* is parallel and adjacent to the dielectric layer 1907*b*. When adjacent to one of the ring antenna circuits 1916*b*, the traveler conductive layer 1935*b* enables the adjacent ring microstrip antenna circuit 1916*b*, with its RFID sensor, to send and receive signals to and from an interrogator (not depicted in FIG. 19*b*) within a frequency band of operation. The traveler 1920*b* in FIG. 19*b* is propelled by a spring 1942*b*, although other forcing elements might be used. As with similar embodiments of an RFID-enabled dispenser discussed herein, in FIG. 19*b*, a plunger 1944*b*, acting through a first opening 1938*b*, pushes the item 1902*b* to be dispensed through a second opening 1940*b*.

Figure 19C:
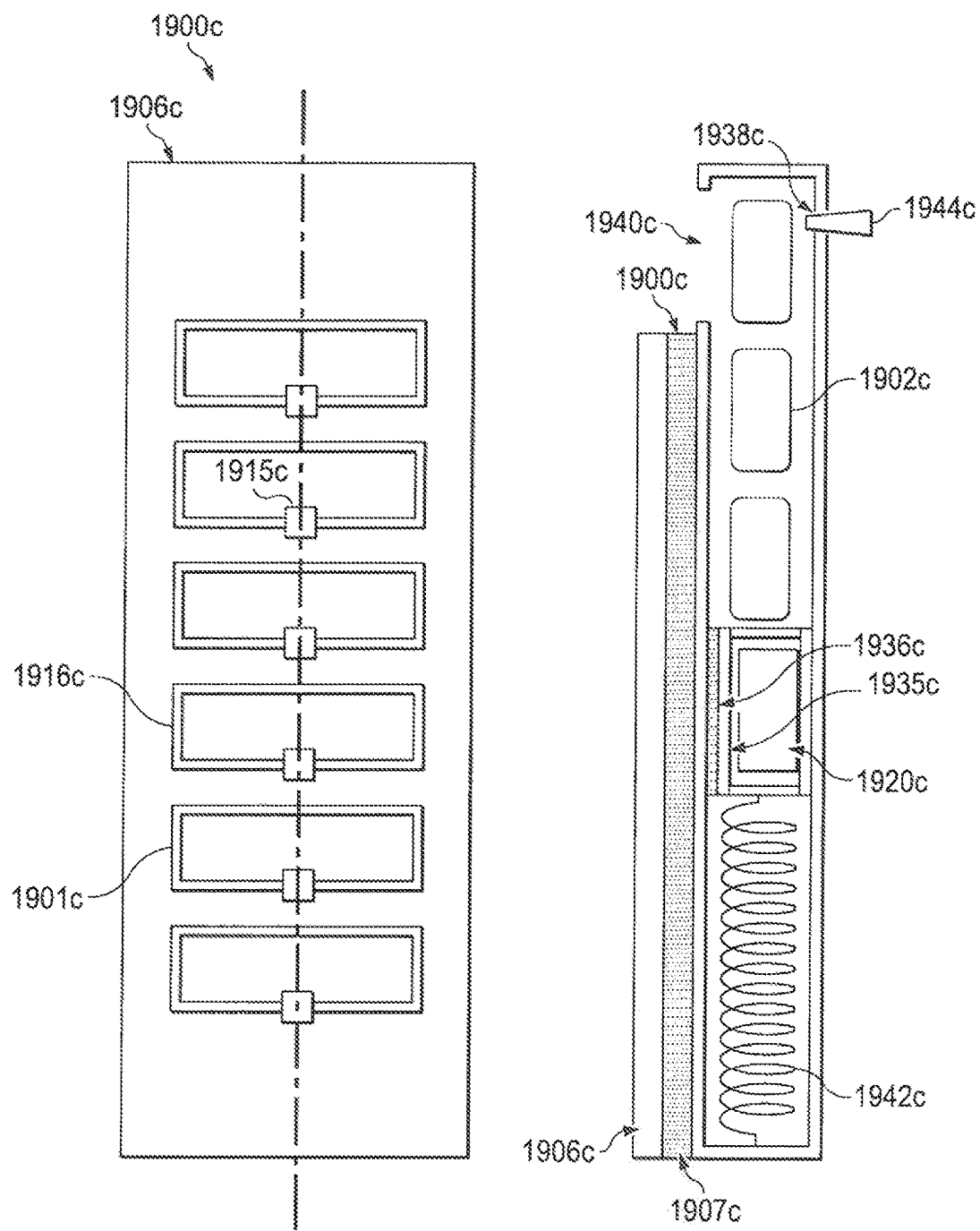
FIG. 19c is a schematic diagram of an RFID-enabled item dispenser having a traveler conductive layer beneath a traveler dielectric layer, in accordance with one or more embodiments described herein.
Figure 19E:
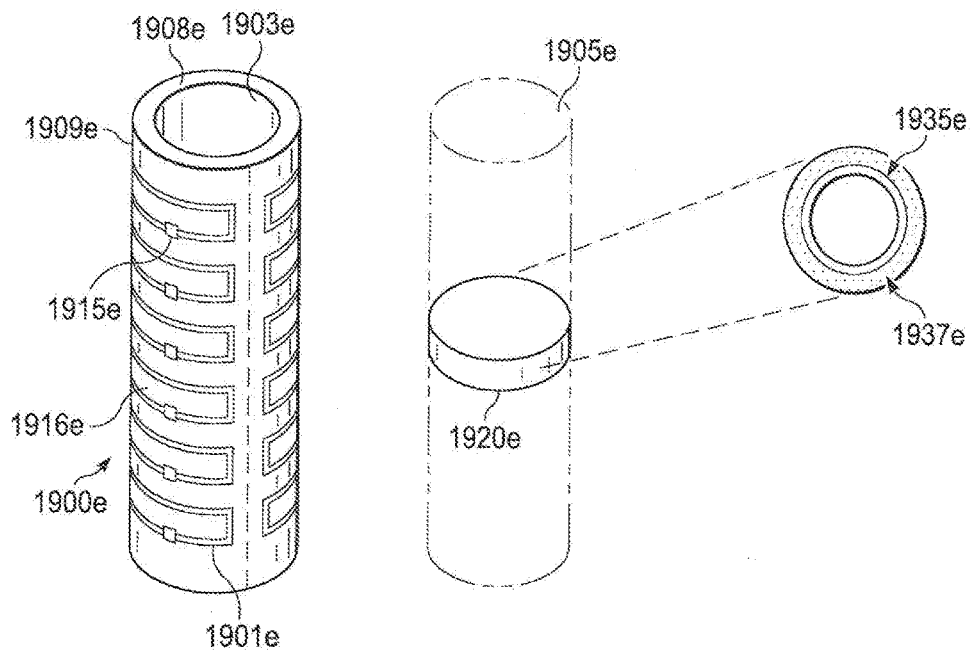
FIG. 19e is a schematic diagram of an RFID-enabled item dispenser having a circular cross section and ring microstrip antennas, in accordance with one or more embodiments described herein.

FIG. 19*e* depicts another embodiment of an RFID-enabled item dispenser 1900*c*, in accordance with one or more embodiments described herein. The RFID-enabled item dispenser 1900*c* is otherwise similar to the embodiment depicted in FIG. 19*b*, but in which a traveler conductive layer 1935*c* is inserted between the body of the traveler 1920*c* and a traveler dielectric layer 1936*c*. Similar to FIG. 19*b*, in FIG. 19*c*, a ring microstrip conductive layer 1906*c* overlays a dielectric layer 1907*c* on the dispenser. The ring microstrip conductive layer 1906*c* forms microstrip ring antenna cells 1901*e*, each having an RFID sensor 1915*c*. The conductive layer 1906*e* may be outside the dielectric layer 1907*c* as depicted in FIG. 19*c* or inside the dielectric layer 1907*c* (not shown in FIG. 19*e* but as depicted in FIG. 19*d* with similar parts 1906*d* (conductive layer) and 1945*d* (insulating layer)). Similar to other embodiments discussed herein, a plunger 1944*c* may act through a first opening 1938*c* to propel items 1902*c* through a second opening 1940*c*. The traveler 1920*c* activated by a spring 1942*c*, forces the items 1902*e* upwards toward the second opening 1940*c*. The position of the traveler 1920*c* and the traveler conductive layer 1935*e* activates a particular microstrip ring antenna cell 1916*c* to send and receive signals to and from an interrogator (not depicted in FIG. 19*c*) within a frequency band of operation.

FIG. 19*d* depicts yet another embodiment of an RFID-enabled item dispenser 1900*d*, otherwise similar to the embodiments of FIGS. 19*b* and 19*c*, in which a traveler conductive surface 1935*d* folded around the traveler dielectric layer 1936*d* provides a ground plane with a short on traveler 1920*d*. In FIG. 19*d*, an insulating layer 1945*d* overlays a ring microstrip conductive layer 1906*d* on the dispenser. The ring microstrip conductive layer 1906*d* forms microstrip ring antenna cells 1901*d*, each having an RFID sensor 1915*d*. The design with the ring microstrip conductive layer 1906*d* on the inside of the insulating layer 1945*d* and the traveler design may allow one to make the microstrip ring antenna cells 1901*d* and the RFID-enabled item dispenser 1900*d* more compact than in other embodiments. Similar to other embodiments discussed herein, a plunger 1944*d* may act through a first opening 1938*d* to move or propel items 1902*d* through a second opening 1940*d*. The traveler 1920*d* activated by a forcing element such as a spring 1942*d*, propels the items 1902*d* upwards toward the second opening 1940*d*. The position of the traveler 1920*d* and the traveler layers 1935*d*, 1936*d* activates a particular microstrip ring antenna cell 1916*d* to send and receive signals to and from an interrogator (not depicted in FIG. 19d) within a frequency band of operation.

FIG. 19e depicts another embodiment in accordance with the present disclosure. An RFID-enabled dispenser 1900e has a cylindrical structure 1909e, with a circular cross-section 1905e and a hollow interior region 1903e. A top layer of ring microstrip antennas 1901e are wrapped around the circumference of cylindrical structure 1909e. The ring microstrip antennas 1901e are each attached to an RFID circuit 1915e. The cylindrical structure 1909e optionally has an insulating layer 1908e. A ground plane typically associated with ring microstrip antennas 1901e is absent in the embodiment depicted in FIG. 19e, except as provided by a traveler 1920e. The traveler 1920e may have an optional traveler dielectric layer 1937e that surrounds a traveler conductive layer 1935e. The traveler 1920e is displaced due to a forcing element, such as a spring (not depicted in FIG. 19e) or as described in other embodiments described herein, when items (not depicted in FIG. 19e) are removed or added. The position of the traveler 1920e allows the traveler conductive layer 1935e to provide a ground plane to a particular microstrip antenna 1916e, to enable the particular microstrip antenna 1916e and allow the RFID circuit attached to the particular microstrip antenna 1916e to send and receive signals to and from an interrogator. The interrogator and a processor operate as described herein with respect to other RFID-enabled item dispensers, but are not specifically shown in FIG. 19e.

Figure 19F:
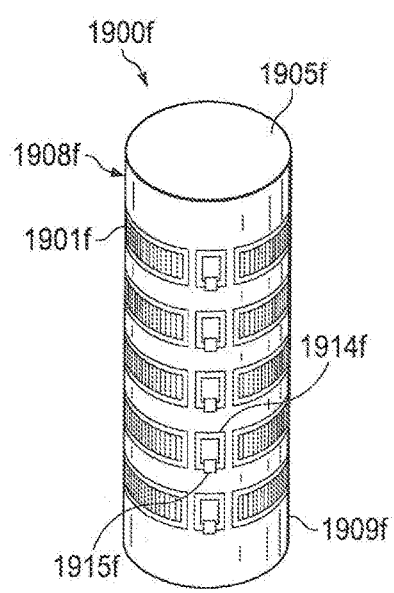
FIG. 19f is a schematic diagram of an RFID-enabled item dispenser having a top conductive layer of one or more microstrip antennas wrapped around a cylinder with a circular cross-section, in accordance with one or more embodiments described herein.

FIG. 19f is an illustration of an RFID-enabled item dispenser 1900f in accordance with one or more embodiments of the present disclosure in which a top conductive layer 1908f of one or more microstrip antennas 19011f is wrapped around a cylinder 1909f with circular cross-section 1905f. As in previously described embodiments, a traveler (not depicted in FIG. 19l) provides the ground plane associated with the top conductive layer 1908f to form a completed microstrip antenna conformal to the cylinder 1909f. A loop 1914f with an RFID integrated circuit 1915f is preferably placed in the gap of each antenna 1901f as depicted in FIG. 19f. In one embodiment, the microstrip antenna 1901f is resonant at approximately one-half wavelength. A traveler mechanism, including the traveler, a forcing element, and a dispensing mechanism would operate as described with respect to other embodiments described herein but is not shown in FIG. 19f.

Figure 20:
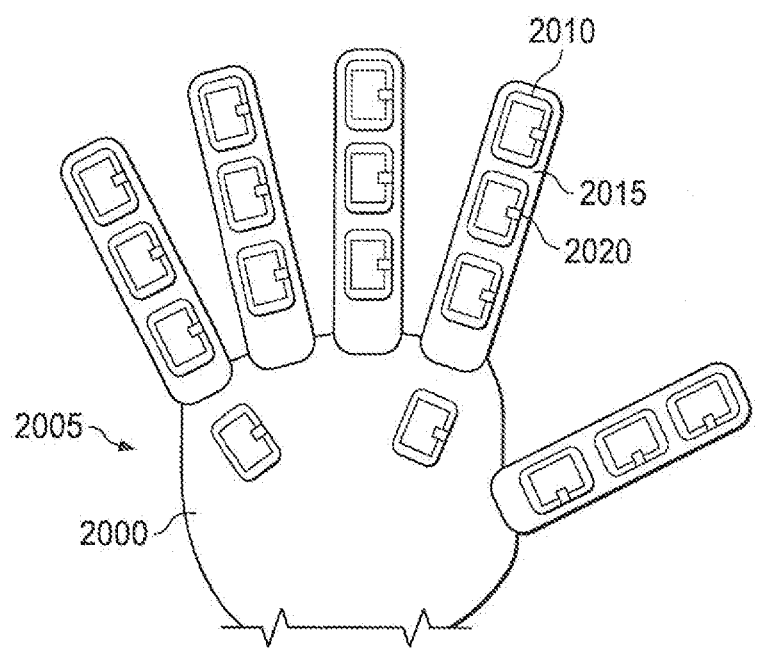
FIG. 20 is a schematic diagram of the palm side of an RFID-enabled pressure sensor glove in accordance with one or more embodiments described herein.
Figure 21:
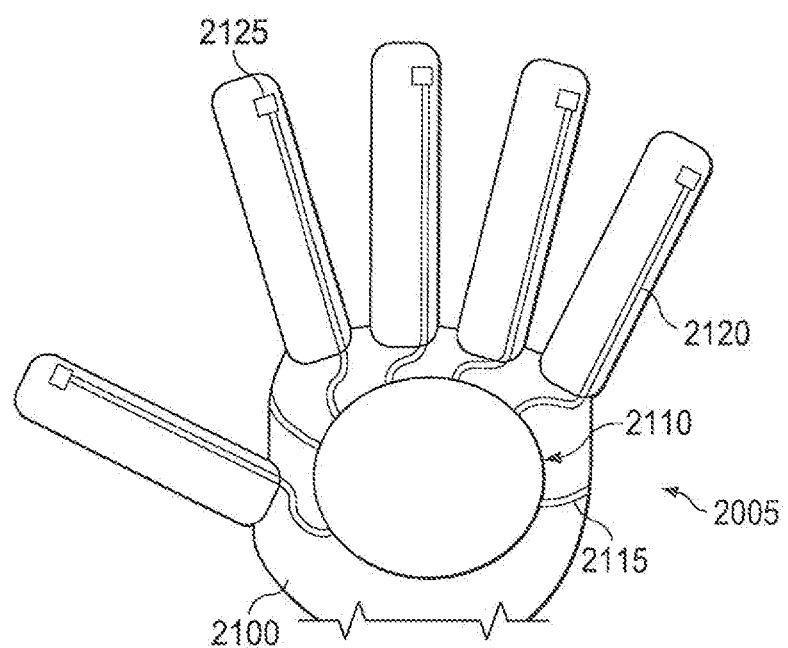
FIG. 21 is a schematic diagram of the back (top) side of an RFID-enabled pressure sensor glove in accordance with one or more embodiments described herein.
Figure 22:
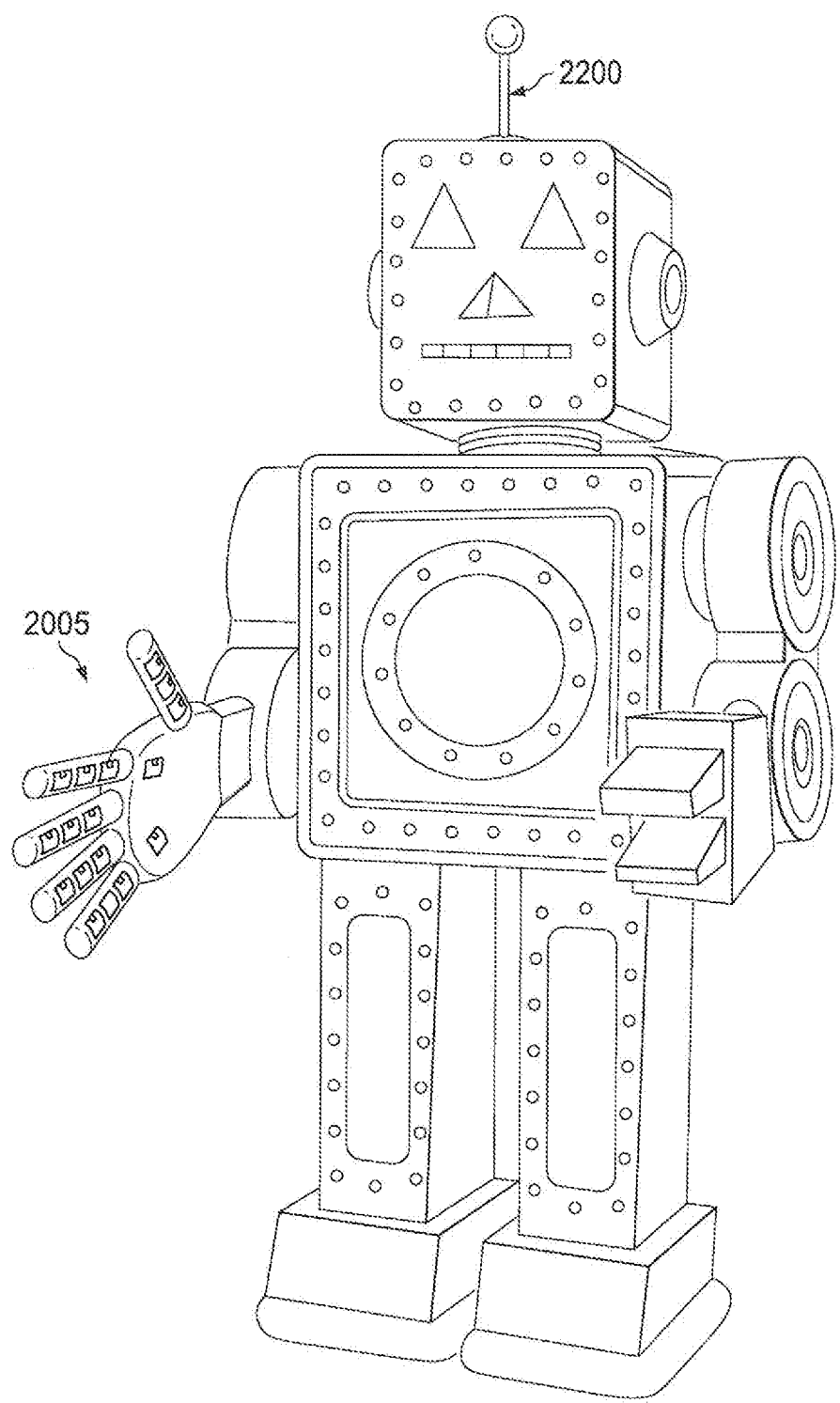
FIG. 22 is a schematic diagram of a robot with an RFID-enabled pressure sensor glove in accordance with one or more embodiments described herein.

FIGS. 20, 21, 22, and 23a-c illustrate one or more embodiments of the present disclosure in the form of a pressure sensor glove 2005. Referring first to FIG. 20, the "palm" 2000 side of a pressure sensor glove 2005 comprises ring elements 2010 positioned on foam pads 2015. The foam pads 2015 are placed at various locations on the palm and digits (i.e., in the areas for the fingers and the thumb), as depicted in FIG. 20, to yield desired sensitivity such that when a ring element 2010 is depressed, the ring element 2010 couples to a source, such as a first microstrip line 2115 or a second microstrip line 2120 (both depicted in FIG. 21). The first microstrip line 2115 would be visible in FIG. 20, but it is hidden under a layer of the glove. On the palm side of the glove, the first microstrip line 2115 may terminate with load elements close to the ring elements situated on the palm. An RFID circuit 2020 is attached to each ring element 2010. FIG. 21 depicts the other side 2100 of the glove, in other words, the back or top side of the glove 2005, in accordance with one or more embodiments described herein. A microstrip patch antenna 2110 is connected to the first microstrip line 2115 for coupling to the ring elements 2010 positioned on the palm and to the multiple second microstrip lines 2120 for coupling to the ring elements 2010 positioned on the digits. A load element 2125 is at the end of each second microstrip line 2120. The load elements 2125 can comprise (for example): (1) a resistive material that absorbs incident electromagnetic (EM) energy to prevent reflections; or (2) an RFID integrated circuit (IC) that reports received power as a status on the health of the system and the amount of power coupled to ring elements 2010. The load elements 2125 act to prevent unintended impedance mismatch. As depicted in FIG. 22, an interrogator 2200, such as a robot-based interrogator, can communicate with the pressure sensor glove 2005 wirelessly, thus eliminating cable runs across joints. A processor (not depicted) may be in communication with the interrogator 2200 to analyze information received by the interrogator 2200.

The "glove" 2005 could take the form of an artificial hand or other gripping tool, as well as a glove that can be removed from a human or mechanical hand. Similarly, although human hands typically have four fingers and one thumb (designed to be an opposing thumb), the glove 2005 of the present disclosure may be designed with a different number or type of digits, if it would be advantageous for a particular application, for example.

Figure 23A:
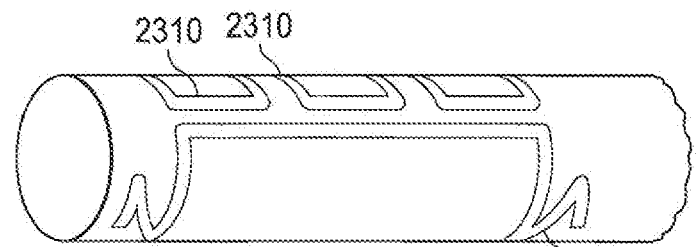
FIGS. 23a-23c depict alternate embodiments each representative of a finger on the RFID-enabled pressure sensor glove of FIGS. 20-22.
Figure 23B:
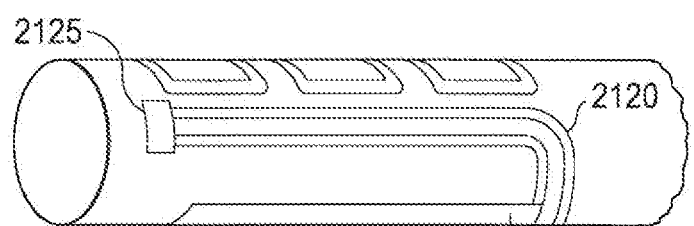
Figure 23C:
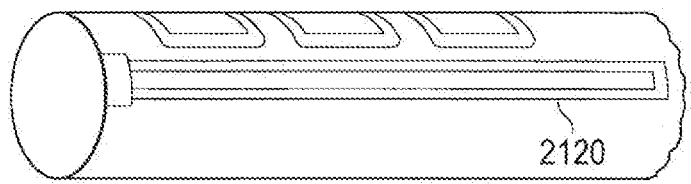

FIGS. 23a-23c each depict a different detailed embodiment of components on the digits of the glove 2005 of FIGS. 20-22, with similar arrangements also available for use on the palm (not shown). In FIG. 23a, a dipole antenna 2305 with direct coupling to depressed rings 2310 is used. The dipole antenna 2305 is partially disposed on the surface of the digit opposite to the positioning of ring elements 2310. The dipole antenna 2305 may include meandered lines to achieve resonance. In operation, when one or more of the ring elements 2310 are depressed, the depressed ring element 2310 directly couples with the dipole antenna 2305. The RFID circuit 2020 on the depressed ring element 2310 is correspondingly energized. The RFID circuit 2020 sends information via the dipole antenna 2305 to the interrogator 2200 and the associated processor for further analysis.

Alternatively, in FIG. 23b, a top antenna 2320 is placed on top of the digit of the glove 2005. (Note the position of the top antenna 2320 relative to the load element 2125.) The top antenna 2320 may, for example, comprise a microstrip patch or a planar inverted "F" antenna. In operation, when one or more of the ring elements 2010 are depressed, the RFID circuit 2020 on the depressed ring element 2010 (or elements) is energized. The energized RFID circuit 2020 sends a response via the top antenna 2320 to the interrogator 2200 and the processor for analysis.

FIG. 23c depicts another alternate embodiment wherein the antenna is remote from the digit (and thus not depicted in FIG. 23c). In this embodiment, the second microstrip line 2120 may be connected to the antenna or the interrogator. In operation, when one or more of the ring elements 2010 are depressed, the RFID circuit 2020 on the depressed ring element 2010 (or elements) is energized. The energized RFID circuit 2020 sends a response via the remote antenna to the interrogator 2200 and the processor for analysis.

Figure 24:
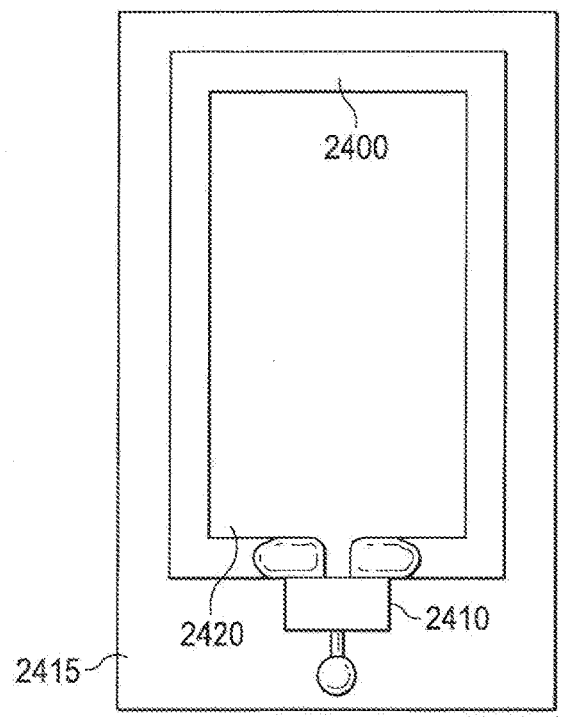
FIG. 24 is a diagram of an RFID tag in accordance with one or more embodiments described herein.

FIGS. 24-27 depict another group of embodiments of the present disclosure. FIG. 24 is a diagram of a prototype of one embodiment. In the diagram of FIG. 24, a microstrip transmission line in a loop 2400 creates a circuit with an RFID sensor 2410. Collectively the transmission line 2400, circuit and RFID sensor 2410 are called an RFID tag 2420. The microstrip transmission line loop 2400 of FIG. 24 is printed on a 20 mil (0.02 inch) thick piece of hydrocarbon ceramic laminate 2415 manufactured by the Rogers Corporation and sold commercially as RO 4350. In this prototype, the RFID sensor 2410 comprises an Alien® Higgs-3 SOT sold commercially by Alien Technology of Margan Hill, Calif. While the loop 2400 is shown as being rectangular, other shapes (square or oval for example) could also be used.

Figure 25:
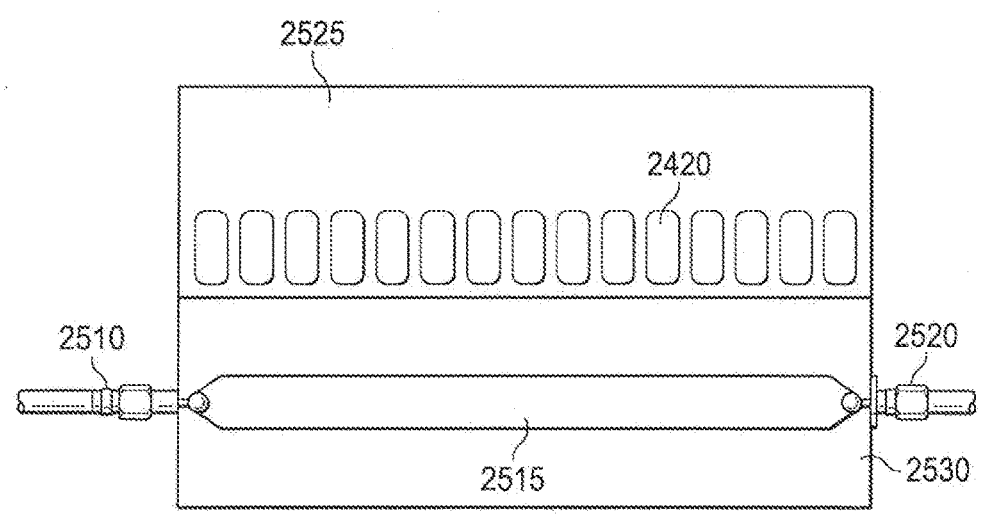
FIG. 25 is a diagram of components of another embodiment described herein.

FIG. 25 is a diagram of components of a prototype of another embodiment of the present disclosure. In the diagram of FIG. 25, a 50 ohm load 2510 is connected to a board structure comprising a second microstrip transmission line 2515, functioning as an operably planar open waveguide, with an RF feed 2520 on the opposing end of the second microstrip transmission line 2515. The RF feed 2520 is connected to an RFID interrogator (not shown specifically in FIG. 25 but represented generally in other drawings herein) for this prototype, but alternatively, an antenna could be used to receive and transmit signals from and to an RFID interrogator, which may have an internal processor or may be connected to an external processor such as a laptop or desktop computer. The second microstrip transmission line 2515 in FIG. 25 is printed on a second base 2530 functioning as an operatively insulating dielectric base, such as a 175 mil thick, ceramic-filled polytetrafluoroethylene (PTFE) composite material sold by the Rogers Corporation commercially as RO 3003. The 50 ohm load 2510 prevents development of a standing wave pattern. The RFID tags 2420 of FIG. 24 are placed on an operatively insulating and compressible substrate 2525, such as a one half inch thick foam block, face down. The RFID tags 2420 are bonded or otherwise fastened to the substrate 2525 to form this component of the prototype.

Figure 26:
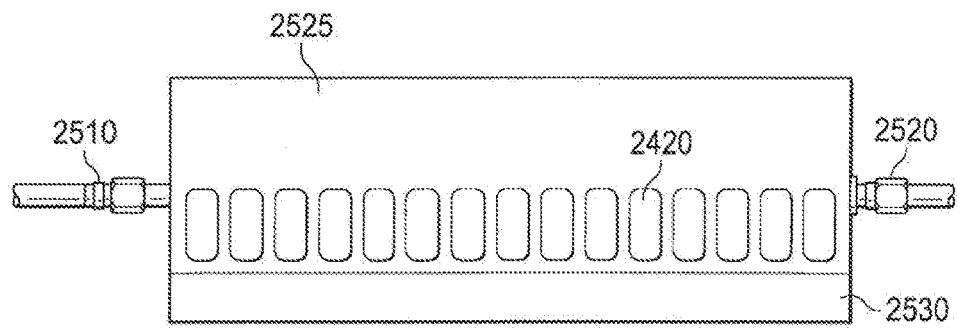
FIG. 26 is a diagram of the proper placement of the components depicted in FIG. 25.

FIG. 26 is a diagram of the proper placement of the components shown in FIG. 25. Specifically, in the diagram of FIG. 26, proper placement of the substrate 2525 with respect to the second transmission line 2515 is depicted. (The second transmission line 2515 is not visible in FIG. 26 or FIG. 27, but its position can be determined by the position of the load 2510 and the RF feed 2520, which can be seen in FIGS. 26 and 27.) The substrate 2525 bearing the RFID tags 2420 is lined up such that that the top of the RFID tags 2420 line up with the bottom edge of the second microstrip transmission line 2515, but the RFID tags 2420 do not lay across the top of the second microstrip transmission line 2515 (which, again, is not visible in FIG. 26, as it is covered by the substrate 2525).

Figure 27:
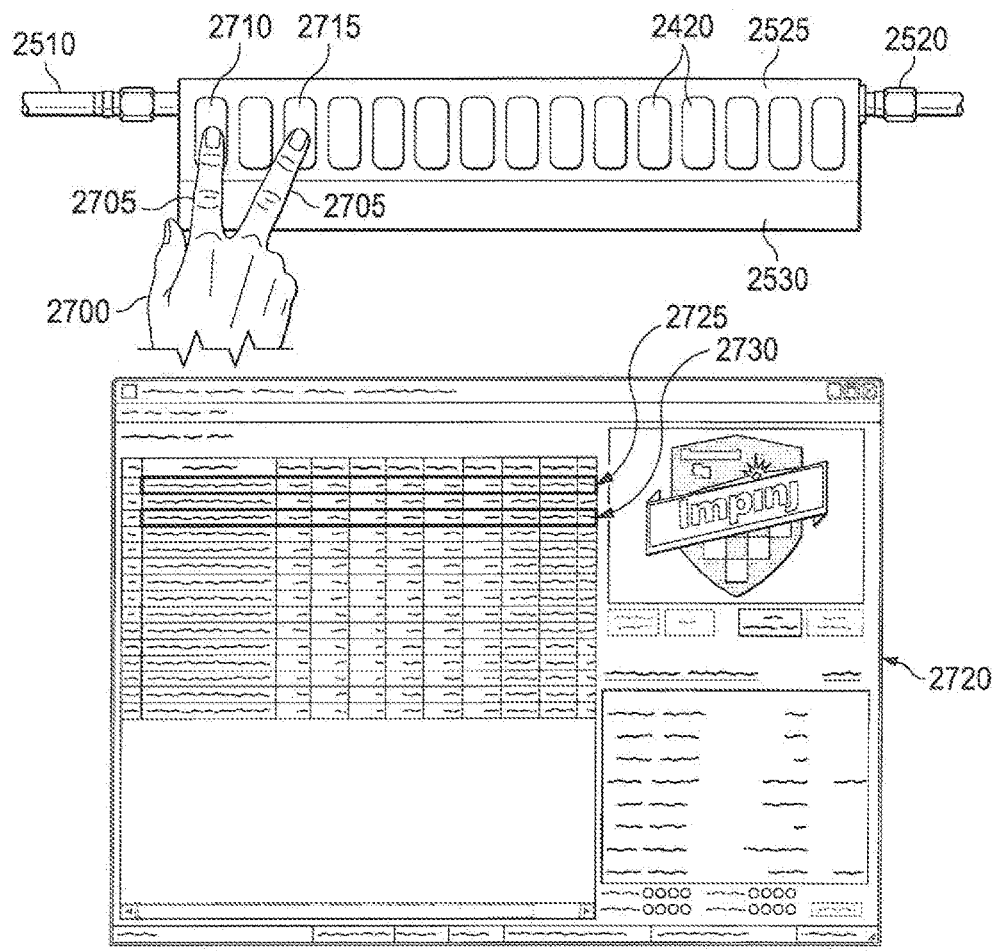
FIG. 27 illustrates the embodiments of FIGS. 24-26 combined with a screen shot of software displaying the results of a test of a prototype.

FIG. 27 contains an illustration of the prototype of FIGS. 24-26 combined with a screen shot of software displaying the results of a test of the prototype. Near the top of FIG. 27, a schematic diagram depicts that the substrate 2525 is properly positioned over the second transmission line 2515, leaving part of the second base 2530 exposed. Near the top of FIG. 27, a schematic diagram of a hand 2700 with two fingers 2705 extended is shown depressing the first and third RFID tags 2710 and 2715. In general, RFID tags 2420 are only energized and thus are only read when depressed, and multiple RFID tags 2420 may be read at one time, or in succession so quickly that to the user the reading is seemingly occurring at the same time. In an alternate embodiment, each RFID tag 2420 further comprises a button configured to be latched upon a first depression by finger 2705 and unlatched upon a subsequent second depression, such that the button when latched holds its state of being capable of being energized when operably depressed until it is unlatched. Software such as the multi-reader software sold as Speedway® Gen2 RFID sold commercially by Impinj, Inc., installed on a processor connected to the RF feed, displays readings from depressed tags. A software display 2720 is depicted in the screenshot of FIG. 27. The display in the screenshot depicts a line for each of the fifteen RFID tags 2420 shown in FIG. 27. If an RFID tag 2420 is not being read, the line for that RFID tag 2420 is red in color. Lines representing the RFID tags being read (2710 and 2715 in this illustration) are displayed in the color white. The first line 2725 and the third line 2730 in the screenshot of FIG. 27 are outlined. On the display, the software provides relevant information from the depressed RFID tags 2420 in a black font with a white background. In this illustrated example, the first and third lines 2725 and 2730, respectively, are providing relevant information, indicating that depression of the corresponding tags 2710 and 2715 are being read successfully.

Figure 28:
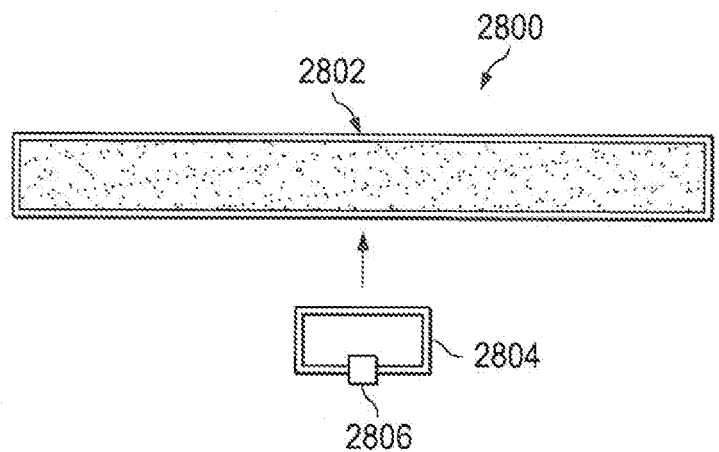
FIG. 28 depicts a ring sensor that may be used in various embodiments described herein.

FIG. 28 depicts a diagram of a ring sensor 2800 which may be used in various embodiments described herein. The ring sensor 2800 may comprise a source element 2802 such as a microstrip waveguide or a type of antenna and a conductive ring 2804 connected to an RFID integrated circuit 2806. While the conductive ring 2804 of FIG. 28 is represented as having a predominantly rectangular shape, the loop of conductive ring 2804 may comprise a variety of other shapes, such as circular, elliptical, triangular, square, trapezoidal, polygonal, or any other shape suitable for performing the function of indicating a position in relation to the source element 2802.

Figure 29A:
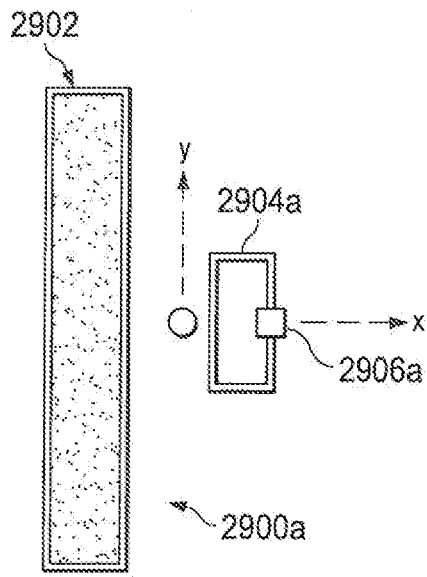
FIG. 29a depicts a ring sensor positioned to couple with a source element in accordance with one or more embodiments described herein.
Figure 29B:
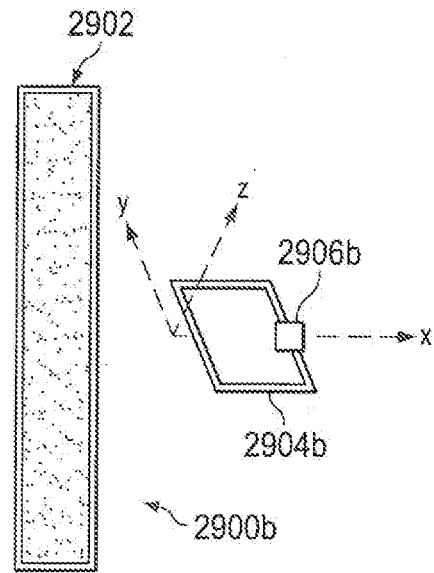
FIG. 29b depicts a ring sensor, which may be used in one or more embodiments described herein, positioned so as to not couple with the source element.

FIG. 29a depicts a diagram of a ring sensor 2900a, which may be used in various embodiments described herein. The ring sensor 2900a comprises a source element 2902, which might be a microstrip waveguide or a type of antenna, and a conductive ring 2904a connected to an RFID integrated circuit 2906a. An RFID interrogator (shown generally in FIG. 1 as interrogator 145 although not shown in FIG. 29a) communicates with the RFID integrated circuit 2906a when the position and rotation of the ring 2904a is suitable for coupling to the source element 2902. In this general sense, the source element 2902 and ring 2904a can be used as a sensor to detect when the ring 2904a has been moved laterally into the enabling position (as shown), vertically, or in general a combination of lateral and vertical positioning (both not shown). In addition, the ring 2904a will not generally couple well when the orientation of the ring edges are not predominantly aligned with the source element 2902. For example in FIG. 29a, the ring 2904a will couple to the source element 2902, whereas in FIG. 29b, the ring 2904b has been rotated about an x-axis such that it no longer couples with the source element 2902. While the conductive ring 2904a of FIG. 29a and the conductive ring 2904b of FIG. 29b are each represented as having a predominantly rectangular shape, the conductive rings 2904a and 2904b of FIGS. 29a-29b may have a variety of other shapes, such as circular, elliptical, triangular, square, trapezoidal, polygonal, or any other shape suitable for performing the function of indicating a position in relation to the source element 2902.

Figure 30A:
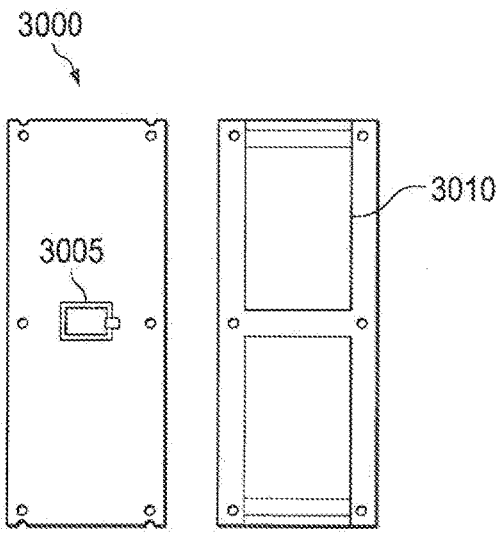
FIGS. 30a and 30b depict a ring sensor used as a sensor to detect whether a hinged door is in an open or closed position in accordance with one or more embodiments described herein.
Figure 30B:
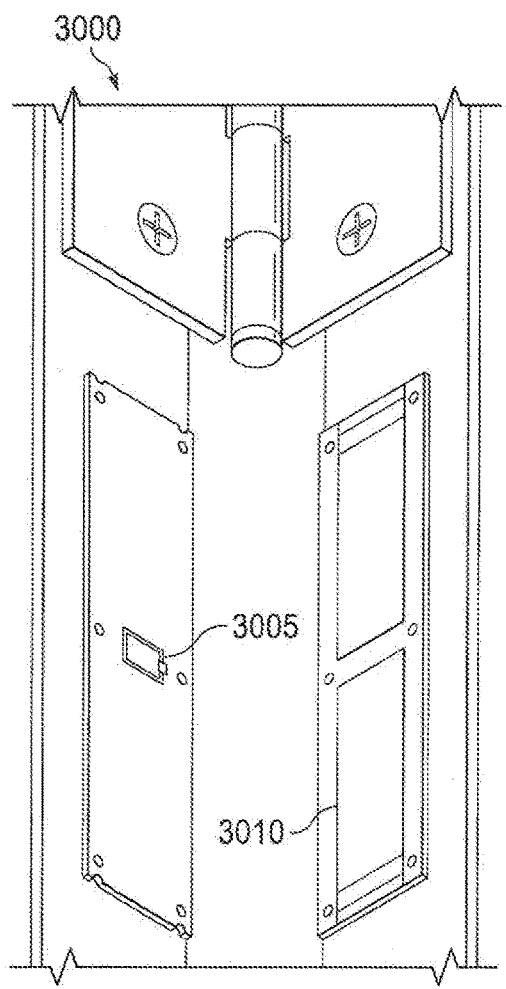

FIGS. 30a and 30b are diagrams of a two-part RFID ring tag 3000 used as a sensor to detect whether a hinged door is in an open or closed position, with FIG. 30b comprising a diagram of the two-part RFID ring tag 3000 installed on a door hinge. The two-part RFID ring tag 3000 comprises a ring circuit 3005 and an antenna 3010. When the two-part RFID ring tag 3000 door is installed on the door hinge as depicted in FIG. 30b and the door is closed, the ring circuit 3005 is suitably close to the antenna 3010 such that the antenna 3010 couples energy to the ring circuit 3005. An interrogator (shown generally as interrogator 145 of FIG. 1 although not depicted in FIG. 30a or 30b) is able to send information to, and receive information from, the energized ring circuit 3005 of the two-part RFID ring tag 3000, signaling that the door is closed.

Figure 31A:
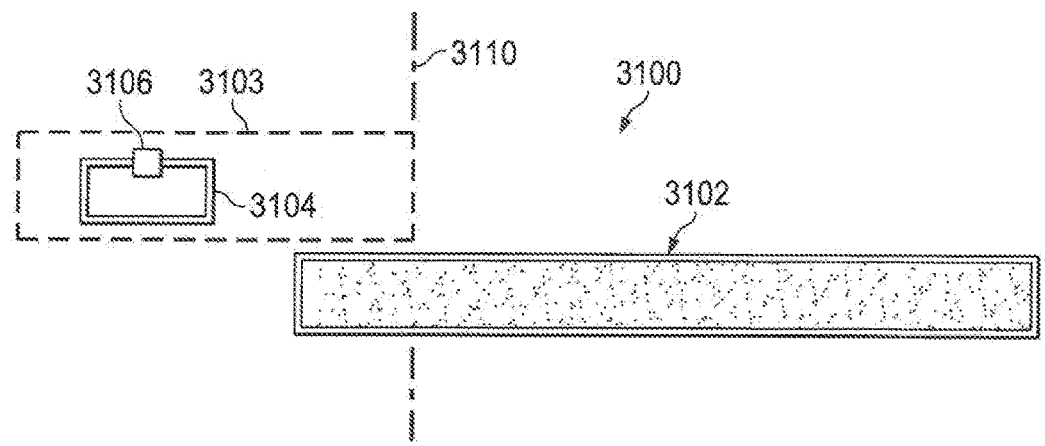
FIGS. 31a and 31b depict a ring sensor, which may be used in one or more embodiments described herein, configured to be used as a switch.
Figure 31B:
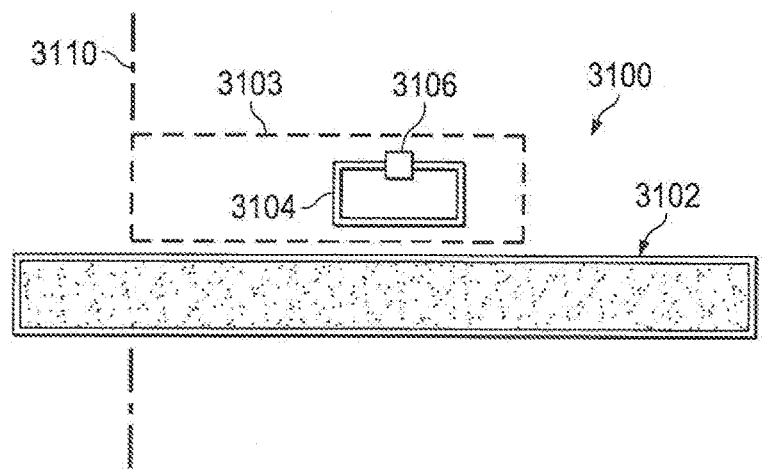

FIGS. 31a and 31b depict another embodiment described herein. In this embodiment, a ring sensor 3100 is used as a switch. The ring sensor or switch 3100 comprises a ring tag 3104 with an RFID integrated circuit 3106 operatively connected thereto. The ring tag 3104 is attached to a membrane 3103 that pivots about a rotational axis 3110. In FIG. 31a, the membrane 3103 is in the "off" state such that the ring tag 3104 is not enabled to couple energy to and from a source element 3102, which might be, for example, a meandered dipole or a microstrip patch antenna. When the membrane 3103 is rotated about the rotational axis 3110, as shown in FIG. 31b, however, the ring tag 3104 is enabled and can receive energy from, or transmit energy to, an interrogator (shown generally as interrogator 145 of FIG. 1 although not shown in FIG. 31a or 31b). The membrane 3103 may be fastened at one or both ends by a latch, a hook-and-loop fastener (commonly referred to as "Velcro", a magnet, or any of a number of other fastening elements, including an adhesive (although not depicted in FIG. 31a or 31b). The membrane 3103 might be an insulating fabric or rigid insulating element. In one embodiment, the membrane 3103 comprises a strip of insulating fabric, the source element 3102 comprises a fabric antenna, and a section of a hook-and-loop fastener is used to fasten the end of the membrane 3103 in either the "off" or "on" position. An array of similar switches may be worn on a shirt and used to communicate commands or other information to a processor through an RFID interrogator.

Any of a number of other switch mechanisms is possible with a variety of options to captivate the ring sensor in both "off" positions, which disable communications to the tag, and "on" positions, which enable communications to a tag.

In light of the principles and exemplary embodiments described and illustrated herein, it will be recognized that the exemplary embodiments can be modified in arrangement and detail without departing from such principles. Also, the foregoing discussion has focused on particular embodiments, but other configurations are contemplated. In particular, even though expressions such as "in one embodiment," "in another embodiment," "in a version of the embodiment" or the like are used herein, these phrases are meant to generally reference the range of possibilities of embodiments, and are not intended to limit the disclosure to the particular embodiments and configurations described herein. As used herein, these terms may reference the same or different embodiments that are combinable into other embodiments.

Similarly, although exemplary processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, or otherwise altered.

In view of the wide variety of useful permutations that may be readily derived from the exemplary embodiments described herein, this detailed description is intended to be illustrative only, and should not be taken as limiting the scope of the disclosure. What is claimed as the disclosure, therefore, are all implementations that come within the scope of the following claims, and all equivalents to such implementations. In the claims, means-plus-function and step-plus-function clauses are intended to cover the structures or acts described herein as performing the recited function and not only structural equivalents, but also equivalent structures. Thus, while a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A radio frequency identification (RFID)-enabled pressure sensing apparatus, comprising:
a plurality of RFID tags attached to an operatively insulating and compressible substrate having a proximal side, a distal side and at least one extension, wherein each RFID tag of the plurality of RFID tags is attached to a near field loop and is positioned on a ring element, each ring element being positioned on a foam pad, each foam pad being attached to the proximal surface of the compressible substrate; and
a collector in communication with the plurality of RFID tags, the collector comprising a microstrip patch antenna positioned on the distal side of the compressible substrate and connected to one or more microstrip lines coupling the microstrip patch antenna to the ring elements, the microstrip lines each terminating in a load element near the end of each extension,
wherein one or more of the RFID tags is energized when operably depressed to send signals via the collector to an interrogator.

2. The apparatus of claim 1, wherein the operatively insulating and compressible substrate is comprised of fabric.

3. The apparatus of claim 2, wherein the substrate is shaped in the form of a human hand.

4. The apparatus of claim 1, wherein a dipole antenna which provides direct coupling to a depressed ring is partially disposed on the distal side of the compressible substrate along the at least one extension and in a location opposite to the ring elements.

5. The apparatus of claim 4, wherein the dipole antenna includes meander lines to achieve resonance.

6. The apparatus of claim 1, wherein secondary antennas are positioned on the at least one extension of the compressible substrate.

7. The apparatus of claim 6, wherein the secondary antennas are microstrip patches.

8. The apparatus of claim 6, wherein the secondary antennas are planar inverted "F" antennas.

9. The apparatus of claim 1, further comprising a secondary antenna remote from the at least one extension.

10. The apparatus of claim 1, further comprising the interrogator that is configured to derive information from the radio frequency signals and forward the information to a processor for analysis.

11. A radio frequency identification (RFID)-enabled pressure sensing apparatus, comprising:
a glove having a palm side and a back side and at least one digit;
a plurality of ring elements, each on a foam pad, the foam pads being attached to the palm side of the glove on the digits and palm, each ring element including an RFID sensor attached to a near field loop; and
a microstrip patch antenna on the back side of the glove, connected to one or more microstrip lines coupling the antenna to the ring elements, the microstrip lines each terminating in a load element near the end of each digit, which prevents development of a standing wave pattern, wherein pressure on a ring element activates its RFID sensor allowing the RFID sensor to transmit a signal to an interrogator.

12. The apparatus of claim 11, wherein the glove is comprised of fabric allowing it to be removed from a hand.

13. The apparatus of claim 11, wherein the glove is an artificial hand.

14. The apparatus of claim 11, wherein a dipole antenna which provides direct coupling to a depressed ring is partially disposed on the surface of a digit in a location opposed to the ring elements.

15. The apparatus of claim 14, wherein the dipole antenna includes meander lines to achieve resonance.

16. The apparatus of claim 11, wherein secondary antennas are positioned on top of the at least one digit of the glove.

17. The apparatus of claim 16, wherein the secondary antennas are microstrip patches.

18. The apparatus of claim 16, wherein the secondary antennas are planar inverted "F" antennas.

19. The apparatus of claim 11, further comprising a secondary antenna remote from the at least one digit.

* * * * *